US011886343B2

(12) United States Patent
Jeffery

(10) Patent No.: US 11,886,343 B2
(45) Date of Patent: Jan. 30, 2024

(54) LOCK-FREE RING BUFFER

(71) Applicant: DreamWorks Animation LLC, Glendale, CA (US)

(72) Inventor: Keith Jeffery, Glendale, CA (US)

(73) Assignee: DREAMWORKS ANIMATION LLC, Glendale, CA (US)

(*) Notice: Subject to any disclaimer, the term of this patent is extended or adjusted under 35 U.S.C. 154(b) by 133 days.

(21) Appl. No.: 17/454,475

(22) Filed: Nov. 10, 2021

(65) Prior Publication Data
US 2022/0327056 A1 Oct. 13, 2022

Related U.S. Application Data

(60) Provisional application No. 63/168,828, filed on Mar. 31, 2021.

(51) Int. Cl.
G06F 12/0815 (2016.01)
G06F 12/0844 (2016.01)

(52) U.S. Cl.
CPC ...... *G06F 12/0815* (2013.01); *G06F 12/0844* (2013.01); *G06F 2212/1041* (2013.01)

(58) Field of Classification Search
None
See application file for complete search history.

(56) References Cited

U.S. PATENT DOCUMENTS

| 8,611,173 | B1* | 12/2013 | Zhang | G11C 7/1075 |
| | | | | 365/230.02 |
| 11,314,566 | B1* | 4/2022 | Klee | G06F 9/542 |
| 2004/0181635 | A1* | 9/2004 | Huras | G06F 9/52 |
| | | | | 711/151 |
| 2009/0204755 | A1 | 8/2009 | Rushworth et al. | |
| 2009/0249356 | A1 | 10/2009 | He et al. | |
| 2010/0332755 | A1 | 12/2010 | Bu et al. | |
| 2011/0078249 | A1* | 3/2011 | Blocksome | G06F 9/544 |
| | | | | 709/206 |
| 2013/0198419 | A1 | 8/2013 | Jones et al. | |
| 2013/0246672 | A1 | 9/2013 | Saputra | |
| 2014/0013021 | A1* | 1/2014 | Matsumoto | G06F 13/38 |
| | | | | 710/267 |

(Continued)

OTHER PUBLICATIONS

European Patent Office Application Serial No. 22165682.0, Extended Search Report dated Aug. 4, 2022, 10 pages.

*Primary Examiner* — Kaushikkumar M Patel
(74) *Attorney, Agent, or Firm* — LEE, HONG, DEGERMAN, KANG & WAIMEY

(57) ABSTRACT

According to at least one embodiment, a method for writing, by a computing thread, data to a ring buffer is disclosed. The method includes determining whether the ring buffer is full. If the ring buffer is not full, the method further includes: reserving an element of the ring buffer for writing the data, wherein reserving the element includes incrementing a size variable corresponding to a number of stored elements in the ring buffer; reserving a portion of the ring buffer at which the data is to be written; and determining whether a state of the portion of the ring buffer is in change by at least one other computing thread. If the state is not in change, the method further includes: marking the state of the portion of the ring buffer as being in change by the computing thread; and writing the data to the portion of the ring buffer.

18 Claims, 13 Drawing Sheets

(56) References Cited

U.S. PATENT DOCUMENTS

| | | | |
|---|---|---|---|
| 2019/0087123 A1* | 3/2019 | Liljedahl | G06F 3/0656 |
| 2019/0236749 A1 | 8/2019 | Gould et al. | |
| 2021/0303375 A1* | 9/2021 | Stevens | G06F 9/544 |
| 2021/0303551 A1* | 9/2021 | Stevens | G06F 9/544 |

* cited by examiner

LOCK-FREE RING BUFFER

CROSS-REFERENCE TO RELATED APPLICATION(S)

Pursuant to 35 U.S.C. § 119(e), this application claims the benefit of U.S. Provisional Patent Application No. 63/168,828, filed on Mar. 31, 2021, the contents of which are hereby incorporated by reference herein in their entirety.

BACKGROUND

A ring buffer, also known as a circular buffer, is a queue (e.g., a first-in-first-out queue) with fixed storage space characteristics. As long as the number of unconsumed elements in the ring buffer does not exceed the (fixed) storage space, the buffer acts as an infinite queue with no dynamic storage overhead. Depending on the implementation, consumers (e.g., an entity seeking to read data from the ring buffer) may encounter a fail or a block if the queue is empty, while producers (e.g., an entity seeking to write data into the ring buffer) may encounter a fail or a block if the queue is full.

SUMMARY

With respect to various embodiments disclosed herein, techniques are described for writing data to (or reading data from) a ring buffer without requiring the use of locks. By way of example, a lock-free ring-buffer is implemented using single-variable atomic operations (e.g., 32-bit single-variable atomic operations). Extensions for two-variable compare-and-swap functions are not necessarily required. Such a buffer does not require dynamic storage management, except for potential initial allocation. Also, it may outperform a naive locking ring buffer. Also, it does not require knowledge of the number of producers or consumers that may use the buffer, which are numbers that can change dynamically at run-time. Also, such a buffer can be used for inter-device memory transactions, including between a central processing unit (CPU) (a first device) and a graphics processing unit (GPU) (a second device) of a computing device, including communication between the CPU and the GPU. With respect to GPU, a single-producer batch push function is constructed so as to require fewer memory transactions. Because GPU architectures may not support native locks, the appeal of lock-free queues may be further enhanced.

According to at least one embodiment, a method for writing, by a computing thread, data to a ring buffer is disclosed. The method includes determining whether the ring buffer is full. In response to determining that the ring buffer is not full, the method further includes: reserving an element of the ring buffer for writing the data, wherein reserving the element includes incrementing a size variable corresponding to a number of stored elements in the ring buffer; reserving a portion of the ring buffer at which the data is to be written; and determining whether a state of the portion of the ring buffer is in change by at least one other computing thread. In response to determining that the state of the portion of the ring buffer is not in change by the at least one other computing thread, the method further includes: marking the state of the portion of the ring buffer as being in change by the computing thread; and writing the data to the portion of the ring buffer.

According to at least one embodiment, a machine-readable non-transitory medium has stored thereon machine-executable instructions for writing, by a computing thread, data to a ring buffer. The instructions include determining whether the ring buffer is full. In response to determining that the ring buffer is not full, the instructions further include: reserving an element of the ring buffer for writing the data, wherein reserving the element comprises incrementing a size variable corresponding to a number of stored elements in the ring buffer; reserving a portion of the ring buffer at which the data is to be written; and determining whether a state of the portion of the ring buffer is in change by at least one other computing thread. In response to determining that the state of the portion of the ring buffer is not in change by the at least one other computing thread, the instructions further include: marking the state of the portion of the ring buffer as being in change by the computing thread; and writing the data to the portion of the ring buffer.

According to at least one embodiment, a method for reading data from a ring buffer by a computing thread is disclosed. The method includes determining whether the ring buffer is empty. In response to determining that the ring buffer is not empty, the method further includes: clearing an element of the ring buffer storing the data, wherein clearing the element comprises decrementing a size variable corresponding to a number of stored elements in the ring buffer; identifying a portion of the ring buffer from which the data is to be read; determining whether a state of the portion of the ring buffer is in change by at least one other computing thread. In response to determining that the state of the portion is not in change by the at least one other computing thread, the method further includes: marking the state of the portion of the ring buffer as being in change by the computing thread; reading the data from the portion of the ring buffer; and destroying the data in the portion of the ring buffer.

BRIEF DESCRIPTION OF THE DRAWINGS

The above and other aspects and features of the present disclosure will become more apparent upon consideration of the following description of embodiments, taken in conjunction with the accompanying drawing figures.

DETAILED DESCRIPTION

In the following detailed description, reference is made to the accompanying drawing figures which form a part hereof, and which show by way of illustration specific embodiments of the present invention. It is to be understood by those of ordinary skill in this technological field that other embodiments may be utilized, and that structural, as well as procedural, changes may be made without departing from the scope of the present invention.

Ring buffers may be implemented with an array, a read index, and a write index. FIGS. 1A, 1B, 1C and 1D illustrate examples of a ring buffer (of no explicit size) in various states.

Figure 1A:
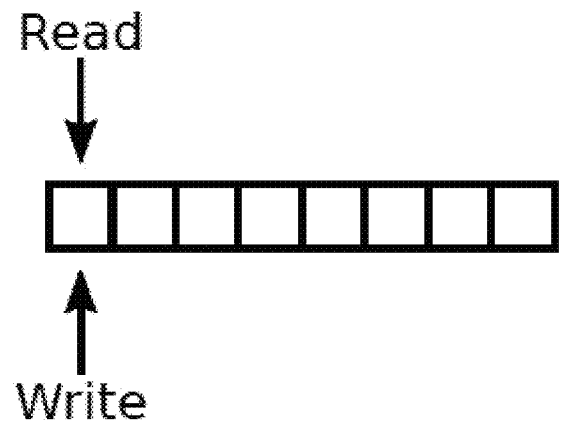
FIGS. 1A, 1B, 1C and 1D illustrate examples of a ring buffer in various states.

FIG. 1A illustrates a buffer that is empty. Here, the buffer does not contain data, and no elements of the buffer are used. As illustrated in FIG. 1A, the buffer is considered as empty if the read index is equal to the write index (initial condition).

Figure 1B:
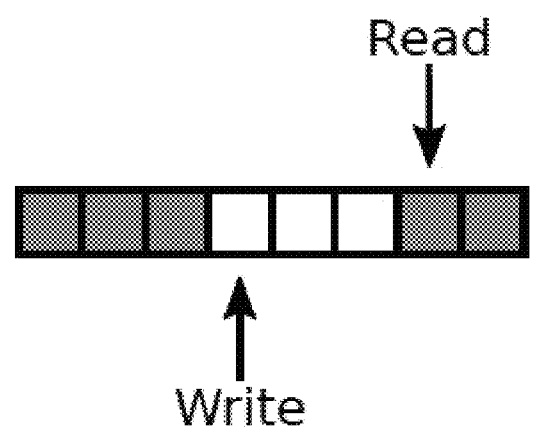
Figure 1C:
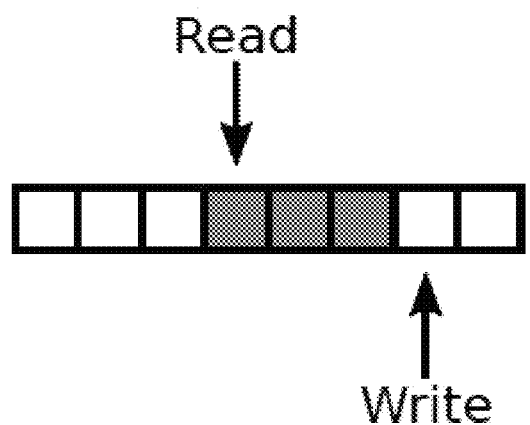

FIG. 1B illustrates a buffer in which five elements are used. In other words, data is stored in five elements of the buffer. FIG. 1C illustrates a buffer in which three elements are used.

Figure 1D:
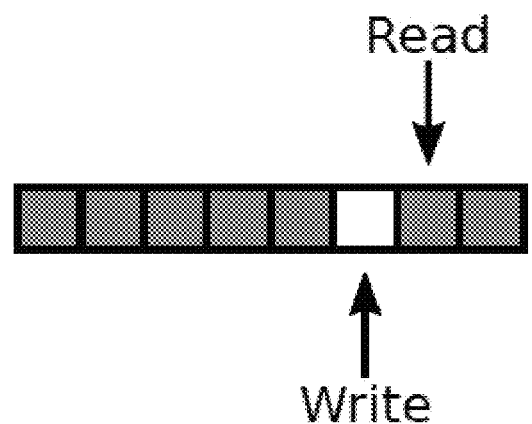

FIG. 1D illustrates a buffer that is full. As illustrated in FIG. 1D, the buffer is considered as being full if incrementing the write index modulo the size would lead to the write and read indices being equal. While not overspecified (for example, in that an explicit size variable is not required), such a scheme means that the maximum number of elements that can be stored in an array of size n is (n−1) elements, and that the queue must have a capacity greater than one.

When a producer pushes a value onto the queue (e.g., the producer seeks to write a value at an element of the queue), it places the value in the array at the write index and then increments the write index modulo the size of the array. A consumer seeking to read a value at an element of the queue modifies the read index in a similar manner. If the size of the array is equal to a (integer) power of two, the modular arithmetic may be accomplished with a bitmask. This introduces relatively little overhead to the increment operation.

Atomic operations access variables while guaranteeing that a variable is written and read in a thread-safe manner: a variable is accessed or modified in a single operation; otherwise, the variable is not accessed or modified at all. Some standards only require that the operation appear to be a single operation, guaranteeing that results are consistent, even in the presence of other threads. As long as the variable cannot be partially written before another thread reads from it, such a standard may consider the operation as being an atomic operation, regardless of whether the operation uses a lock in its implementation.

In the manner described above, the atomic nature of an operation guarantees that the operation ultimately either succeeds or fails such that the acted-upon variables are in a consistent state. Aside from guaranteeing that variables are read and written in a completed manner before another thread can access them, visibility is also addressed. If a thread writes to a variable, at some point, that variable may be propagated across local cache and memory boundaries. Also, programming that utilizes atomic operations often relies on careful instruction ordering. Sometimes the compiler and the processor must be instructed not to reorder instructions around the code where an atomic operation is performed. These tasks may be the responsibility of memory fences (also known as memory barriers). Memory fences may not have to be explicitly specified, depending on the application programming interface (API) in use. For purposes of efficiency, a programmer may sometimes relax instruction ordering and memory propagation.

For ease of description, various embodiments of the present disclosure will be described with reference to processes that primarily use three different atomic operations: atomic-load, atomic-store, and atomic-compare-and-swap (denoted as "CAS" in pseudo-code examples). The atomic-load operation involves reading from an atomic variable. The atomic-store operation involves writing to an atomic variable. Atomic-add may be used, but it is understood that this operation can be substituted with compare-and-swap (e.g., if necessary). Other operations that may be used include atomic-wait and atomic-notify. An atomic-wait operation causes a thread to wait for a variable to change. An atomic-notify operation notifies a waiting thread that a variable has changed. However, it is understood that, according to at least one embodiment, processes do not necessarily rely on atomic-wait and/or atomic-notify operations.

Assuming strong memory fences, it is understood that using an atomic load or store will offer particular characteristics or provide certain results.

First, the entire variable will be read or written in a consistent state. For example, if a variable is 32-bits long, a load operation would not read 16 bits of the variable, and then be interrupted by another thread storing to that variable before continuing to read the remaining 16 bits. For purposes of simplicity, an example will be described with reference to a variable having a length of 4 bits. In this example, a first thread (Thread A) is atomically loading from a variable that initially has a value of $1010_2$. If a second thread (Thread B) is atomically storing a value of $1111_2$ to the same variable, it is possible for Thread A to read only one of two possible values ($1010_2$ or $1111_2$), depending on the ordering of operations. However, it is not possible that Thread A would read some combination of the two values, for example, $1110_2$.

Second, operations that are listed in code before the atomic operation (e.g., atomic read) will not be reordered by either the compiler or the processor such that the earlier operations are executed after the read. Similarly, operations that are listed in code after the atomic read will not be reordered such that the later operations are executed before the atomic read.

Third, all memory and local caches will be updated at the time of the load, even from other processors, so that variables are up to date.

An atomic compare-and-swap is an atomic read-modify-write operation that takes (or receives) three arguments and returns a Boolean value that indicates either success (e.g., true) or failure (e.g., false). For an atomic compare-and-swap operation, ALGORITHM 1 below provides an example of pseudo-code according to at least one embodiment.

| ALGORITHM 1: Atomic compare-and-swap pseudo-code |
| --- |
| 1    CAS(valueToUpdate, comparisonValue, newValue) |
|        \|   input   :a value to attempt to update: valueToUpdate, a value to which to compare to valueToUpdate: |
|        \|               comparisonValue, and the desired new value for valueToUpdate: newValue |
|        \|   output:A boolean denoting success or failure |
| 2    \|   v ← valueToUpdate |
| 3    \|   if v == comparisonValue then |
| 4    \|     \|            valueToUpdate ← newValue |
| 5    \|     \|            return true |
| 6    \|   else |
| 7    \|     \|            comparisonValue ← v |
| 8    \|     \|            return false |
| 9    \|   end |

Although the pseudo-code of ALGORITHM 1 is made up of only several lines, it is understood that the operations of these lines are executed such that another thread cannot interfere. The compare-and-swap first reads the value of a variable that is to be updated (valueToUpdate) (see line 2 of ALGORITHM 1). Then, the compare-and-swap compares the read value against an expected value (comparison Value) (see line 3 of ALGORITHM 1). If it is determined that the values are equal to each other, a second value (newValue) is written to the variable (see line 4 of ALGORITHM 1), and the caller of the compare-and-swap operation is notified that the operation was successful (see line 5 of ALGORITHM 1). If it is determined that the values are not equal to each other, then comparison Value is updated with the value that had been read at line 2. Also, the caller is notified that the operation failed (see line 8 of ALGORITHM 2). The updating of comparison Value facilitates use of the operation in loops, for example, to ensure an update.

An example use of the operation in a loop is illustrated in the pseudo-code of ALGORITHM 2.

| ALGORITHM 2: Atomic add pseudo-code |
| --- |
| 1    add(valueToUpdate, n) |
| 2    \|   v ← valueToUpdate |
| 3    \|   while not CAS(valueToUpdate, v, v + n) do |
| 4    \|     \|   // No loop body. v automatically gets updated if CAS fails. |
| 5    \|   end |

In concurrent programming where multiple threads of execution may be involved, locks can be used to enforce limits on access to a particular resource. An example resource is shared memory. In this example, a lock may be placed around that memory such that only one thread can access the memory at a given time. In general, such a lock may effectively block out entire sections of code.

In concurrent programming with threads, access to shared resources may be controlled to ensure state consistency. The most common shared resource is memory. The most common way to ensure consistency is through mutual exclusion, which is often enforced through an operating system-supported construct: a mutex (a portmanteau of "mutual exclusion"), which is used to identify mutually exclusive blocks of code which access the shared resources. These mutexes can be locked, allowing only one thread (the one holding the lock) to read or write to the resources used in that block of code. One of the drawbacks of locking code is that it makes otherwise concurrent processing serial for the lock duration, making other threads wait while this processing is being completed. Locks do not have to be as explicit as a mutex: similar waiting can be done in a loop, called a spinlock or busy wait. While a thread waiting in this manner is still running, it is completing no meaningful work.

In this disclosure, various embodiments may be described with reference to being non-blocking and/or lock-free. According to various embodiments, a non-blocking algorithm allows other threads to complete their work even if another thread is suspended or terminated. According to various embodiments, a lock-free algorithm will complete in a finite number of steps. Given enough time, at least one thread is guaranteed to make progress. Labeling an algorithm as lock-free is a stronger guarantee than simply not using operating system or API-supplied mutex constructs. Lock-freedom is also taken to imply obstruction-freedom. According to various embodiments, in an obstruction-free algorithm, any thread run in isolation is guaranteed to complete its task, and any failures will be rolled back to leave the data structures in a consistent, even if potentially unknown, state.

Lock-free algorithms eschew thread mutual exclusion using locks, and generally utilize atomic operations. In this regard, the algorithms are written in a manner such that any thread preemption leaves the process in a consistent or recoverable state. Lock-free algorithms generally reduce stalls and priority inversion, where a high-priority thread can be blocked from completing its work. While lock-free algorithms are not guaranteed to be more efficient than their locking counterparts, they often are.

When locks are not used to provide mutual exclusion to blocks of code, race conditions may occur. Such race conditions may occur between reading a variable and writing back to the same variable. According to at least one embodiment, such race conditions are mitigated by using atomic compare-and-swap functions: a value (of a variable) is overwritten only if its stored value is equal to an expected value. If such a compare-and-swap fails, a variable (e.g., a local variable) carrying the expected value is atomically updated with a value stored in the variable for which the update was attempted (see pseudo-code of ALGORITHM 1). As explained earlier with reference to ALGORITHM 1, this (intermediate) update facilitates using compare-and-swap operations in a loop until the target update succeeds.

Even when using atomic compare-and-swap functions, lock-free algorithms may suffer from a problem known as the ABA problem. The name of this problem originates from situations where a first thread reads a variable that is in state A. Before this first thread can write a value into this variable, another thread (or threads) changes the state of the variable to B and then back to A. From the perspective of the first thread, it appears that the state of the variable has not changed, and it proceeds with its update. However, the state of the variable may be such that it is no longer safe to perform any updates.

According to one approach, a lock-free ring buffer is implemented. However, it is acknowledged that a corresponding queue is not entirely ABA safe. To address this, the probability of encountering the ABA problem may be reduced by arbitrarily increasing the size of the underlying storage.

In the above approach, memory addresses (pointers) are stored instead of actual data. This implies that the client code has to either dynamically allocate the data or use a static memory arena from which to allocate new data. In the long run, this leads to fragmented memory access, which slows down cache performance and makes it impossible to efficiently transfer between the CPU and GPU, where large contiguous batch transfers are preferred. Head and tail pointers are allowed to lag behind the actual occupancy to reduce compare-and-swap operations. This comes at the cost of each producer and consumer having to do a local search for the actual head or tail pointer.

Another approach details an implementation of a lock-free multi-producer/multi-consumer ring buffer queue. However, the implementation requires prerequisite knowledge of the number of producers and consumers. According to various embodiments described herein, knowledge of the number of producers or the number of consumers is not required, and the number can change dynamically without informing the queue of changes.

Some C++ libraries may offer an alternative approach with a multi-producer/multi-consumer queue that can be configured to use a fixed-size allocation pool. The queue reuses array indices as nodes that are popped from a data structure, so the queue relies on 16-bit tags to avoid the ABA problem while maintaining a 16-bit array index. However, this limits the size of the queue to $2^{16}$ elements. This design also has the drawback of disallowing efficient single-producer batch pushing, as will be described in more detail later with reference to batch single producer insertion. Such a library may also offer a queue with unbounded dynamic allocation. Embodiments of the present disclosure will be described with reference to a lock-free ring buffer that does not have the shortcomings as described with respect to the aforementioned approaches.

For purposes of description, embodiments of the present invention will be described with reference to a producer push functionality. It is understood that corresponding consumer pop functions may be similar, with certain exceptions. For example, checks for a full buffer (in a push function) may be replaced with checks for an empty buffer (in a pop function). As another example, object construction (in a push function) may be replaced with object destruction (in a pop function).

Unless specified otherwise, various embodiments operate under certain assumptions. First, all atomic operations also enable strong memory fences and instruction fences. A memory fence is a type of barrier instruction that causes a CPU or compiler to enforce an ordering constraint on memory operations issued before and after the barrier instruction. Also, compare-and-swap operations do not suffer from spurious wake-ups, which occur, e.g., when a thread wakes up from waiting on a condition variable that has been signaled, only to discover that the condition for which it was waiting is not satisfied.

For purposes of description, examples of pseudo-code will be described or provided following several conventions. First, array indices start at 0. Also, class member variables are prefixed with the letter 'm.'

An example of a non-thread-safe push function is illustrated in the pseudo-code of ALGORITHM 3 below. It is noted that later algorithms detailed in this disclosure may utilize the Increment(input) function, as illustrated in ALGORITHM 3.

| ALGORITHM 3: A non-thread-safe push function |
| --- |
| 1   Increment(input) |
|              input  :An index into the array mData |
|              output:The next index |
| 2         return (input + 1) mod capacity |
| 3   Full( ) |
| 4         return Increment(mWriteIndex) == mReadIndex |
| 5   TryPush(input) |
| 6      if Full( ) then |
| 7         return false |
| 8      end |
| 9      writeIndex ← mWriteIndex |
| 10     mNodes[writeIndex] ← Construct (input) |
| 11     mWriteIndex ← Increment(mWriteIndex) |
| 12     return true |

The example of ALGORITHM 3 does not have thread synchronization. However, it demonstrates the underlying logic of a push operation on a ring buffer.

One attempt at rendering the example of ALGORITHM 3 thread-safe may involve making the access of mWriteIndex and mReadIndex atomic. However, several problems may quickly arise. For example, there may be a race condition between the initial read of the write index and storing again to the index. If a first thread (Thread A) reads a value of x from mWriteIndex, a second thread (Thread B) could also read the value of x before either thread increments it, thereby allowing one thread to overwrite data of another thread.

There is a problematic race condition between reading from the index, using the index for construction into an array slot, and writing to the index, according to the example of ALGORITHM 3.

According to at least one embodiment, the race condition may be addressed by using an atomic compare-and-swap function. Accordingly, the member variable mWriteIndex is not incremented until the function observes that the variable has the value that it expects. The local variable writeIndex is set to the non-incremented value, which is used to access the array slot. This is illustrated in the pseudo-code of ALGORITHM 4 below.

| ALGORITHM 4: An incorrect first attempt at a thread-safe push function |
| --- |
| 1   TryPush(input) |
| 2      if Full( ) then |
| 3         return false |
| 4      end |
| 5      writeIndex ← AtomicLoad(mWriteIndex) |
| 6      while not CAS(mWriteIndex, writeIndex, Increment(writeIndex)) do |
| 7         // No loop body |
| 8      end |
| 9      mNodes[writeIndex] ← Construct(input) |
| 10     return true |

However, the example of ALGORITHM 4 is still subject to a race condition: the queue could become full between the check for space (see, e.g., line 2 of ALGORITHM 4) and the write (see, e.g., line 9 of ALGORITHM 4, thereby causing valid data to become overwritten.

According to at least one embodiment, it is recognized that checking the write index against the read index may require a two-variable atomic comparison. This is because, for example, the implementation of the Full( ) operation (see, e.g., the check at line 2 of ALGORITHM 4) cannot be made thread-safe with single-variable atomic operations. According to at least one embodiment, an explicit size variable can be added to address a problem of two-variable atomic comparisons. In this regard, when the array size is checked at the beginning of the function, no progress is made unless the function knows there is space in which to place the data. This is illustrated in the pseudo-code of ALGORITHM 5 below.

The example of ALGORITHM 6 uses a Boolean flag corresponding to the state of construction and destruction. However, it may also introduce a wrap-around ABA race condition. Other threads may read from and write to the queue such that another producer could write to the array slot between the check as to whether or not a location is occupied and the construction of the data.

According to at least one embodiment, such a data-destroying race condition can be solved by using a three-state flag instead of a simple Boolean flag. According to at least one particular embodiment, such a flag indicates a status of a particular slot with respect to construction and destruction. For example, the flag may carry any of three possible values: unoccupied; in transition; and occupied. In operation, a function according to at least one embodiment checks for an unoccupied slot, and atomically marks the unoccupied slot as being "in transition" so that no other producer can write to the slot and so that no consumer can

```
ALGORITHM 5: An incorrect second attempt at a thread-safe push function

1    TryPush(input)
2    |    size ← AtomicLoad(mSize)
3    |    if size == capacity then
4    |    |                    return false
5    |    end
6    |    while not CAS(mSize, size, size +1) do
7    |    |                    if size == capacity then
8    |    |                    |    return false
9    |    |                    end
10   |    end
11   |    writeIndex ← AtomicLoad(mWriteIndex)
12   |    while not CAS(mWriteIndex, writeIndex, Increment(writeIndex)) do
13   |    |                    // No loop body
14   |    end
15   |    mNodes[writeIndex] ← Construct(input)
16   |    return true
```

Adding an explicit size addresses limitations noted earlier: for example, the queue can now store elements at each index when it is full, and the queue capacity minimum can be equal to one. However, if the size is increased and an index is assigned, a race condition may still be triggered due to consumers assuming this indicates that valid data is now present. One approach for addressing this is illustrated in the pseudo-code of ALGORITHM 6.

read from the slot. After constructing the data (e.g., writing data to the slot), the operating thread marks the slot as "occupied," thereby blocking other producers from using the slot, but allowing consumers to read from it.

An example of a lock-free multi-producer/multi-consumer ring buffer push function according to at least one embodiment is illustrated in the pseudo-code of ALGORITHM 7.

```
ALGORITHM 6: An incorrect third attempt at a thread-sale push function

1    TryPush(input)
2    |    size ← AtomicLoad(mSize)
3    |    if size == capacity then
4    |    |                    return false
5    |    end
6    |    while not CAS(mSize, size, size +1) do
7    |    |                    if size == capacity then
8    |    |                    |    return false
9    |    |                    end
10   |    end
11   |    writeIndex ← AtomicLoad(mWriteIndex)
12   |    while not CAS(mWriteIndex, writeIndex, Increment (writeIndex)) do
13   |    |                    // No loop body
14   |    end
15   |    while not AtomicLoad(mNodes[writeIndex].populatedState) do
16   |    |                    // No loop body
17   |    end
18   |    mNodes[writeIndex] ← Construct(input)
19   |    mNodes[writeIndex].populated State ← AtomicStore(occupied)
20   |    return true
```

ALGORITHM 7: A multi-producer/multi-consumer ring buffer push function.

```
1   TryPush(input)
2   |  size ← AtomicLoad(mSize)
3   |  if size == capacity then
4   |  |  return false
5   |  end
6   |  while not CAS(mSize, size, size +1) do
7   |  |  if size == capacity then
8   |  |  |  return false
9   |  |  end
10  |  end
11  |  writeIndex ← AtomicLoad(mWriteIndex)
12  |  while not CAS(mWriteIndex, writeIndex, Increment(writeIndex)) do
13  |  |  // No loop body
14  |  end
15  |  populatedState ← unoccupied
16  |  while not CAS(mNodes[writeIndex].populatedState, populatedState, inTransition) do
17  |  |  compile-time-if supports atomic waits then
18  |  |  |  // Wait for the occupied flag to change from what was read
19  |  |  |  AtomicWait(mNodes[writeIndex].populatedState, populatedState)
20  |  |  else
21  |  |  |  Yield ( )
22  |  |  endif
23  |  |  // Only update when it is unoccupied
24  |  |  populatedState ← unoccupied
25  |  end
26  |  mNodes[writeIndex] ← Construct(input)
27  |  mNodes[writeIndex].populatedState ← AtomicStore (occupied)
28  |  compile-time-if supports atomic waits then
29  |  |  // For implementations that support atomic waits
30  |  |  AtomicNotifyAll(mSize)
31  |  |  AtomicNotifyAll(mNodes[writeIndex].populatedState)
32  |  endif
33  |  return true
```

Figure 2A:
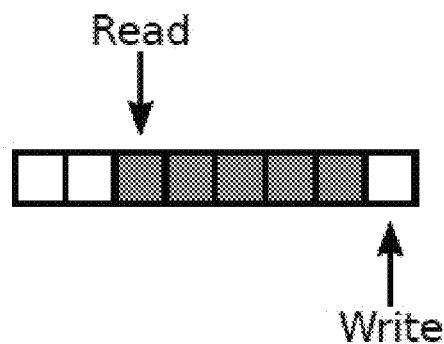
FIGS. 2A, 2B and 2C illustrate example states of a ring buffer.

Operations of the example of ALGORITHM 7 will now be described with reference to FIGS. 2A, 2B and 2C. FIG. 2A illustrates an example initial state of a buffer. As illustrated, there are 5 elements stored in the buffer. The value of 5 corresponds to the variable mSize, which is read at line 2.

Referring to ALGORITHM 7, at the beginning of the TryPush( ) operation at line 2, an atomic load operation is performed on the variable size with a value contained in the variable mSize. At line 3, it is determined whether the read value of size is equal to the capacity of the buffer. The capacity represents the total number of elements that can be stored in the buffer and may be a parameter that is static. In contrast, the value of the variable mSize may change, e.g., as elements are utilized by producers and/or elements are consumed by consumers.

The determination at line 3 is performed due to the possibility of a race condition between the atomic loading of the variable mSize and the comparison of the read value of size against the capacity of the buffer. In other words, it is possible for the number of elements stored in the buffer to change between the read occurring at line 2 and the check that occurs at line 3.

This check serves to ensure that the following operation at line 6 (e.g., atomic compare-and-swap) does not increase mSize beyond the capacity. Because the read value is less than the capacity of the buffer, the operations proceed.

At line 6, an attempt is made to increase the value of the variable mSize by 1. In this regard, a successful attempt would indicate that the buffer was not previously full, and that it is guaranteed that there is space in the buffer for the new data that is to be written. In the compare-and-swap operation of line 6, three scenarios may be considered. First, if mSize is equal to the expected value (i.e., size), then the operation proceeds: the compare-and-swap returns a value of true, and the value of mSize is successfully incremented in the modular space. The ABA problem is not a consideration in this scenario, as it does not affect whether there is space in the buffer.

The second scenario will be described with reference to FIG. 2B. In this scenario, the number of elements stored in the buffer has been changed (relative to the scenario of FIG. 2A) by other threads. As illustrated in FIG. 2B, there are 7 elements stored in the buffer. However, the buffer is not full. In this scenario, the attempt to increase the value of the variable mSize will fail (in other words, the compare-and-swap operation at line 6 will return a value of false). This is because the value of mSize is not equal to the read value of line 2. The compare-and-swap operation will then set the variable size to be equal to the value of mSize (a value of 7, as illustrated in FIG. 2B). Because the updated value of size (7) is not equal to capacity (8), the while operation at line 6 will loop. Assuming that the value of mSize has not been modified at this next iteration, the compare-and-swap operation at line 6 will succeed on the next iteration, thereby allowing the value of mSize to be increased.

Figure 2B:
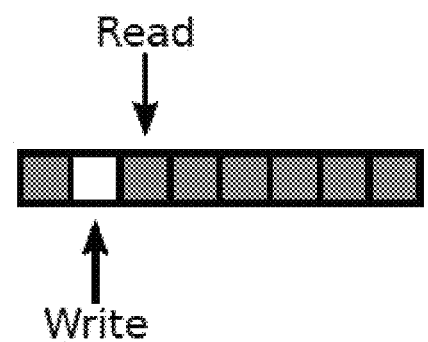
Figure 2C:
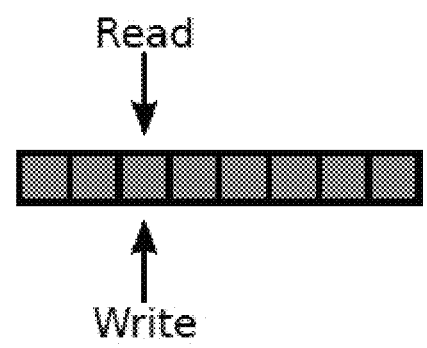

In the scenarios of FIGS. 2A and 2B, the success of the compare-and-swap operation includes increasing the value of the variable mSize. Accordingly, it is appreciated that the variable indicating the number of elements stored in the buffer is increased, before data is written into any additional element(s). As such, a slot for writing such data has been reserved, rendering any other thread(s) incapable of causing the value of the variable mSize to exceed the capacity.

The third scenario will be described with reference to FIG. 2C. The scenario illustrated in FIG. 2C is similar to that illustrated in FIG. 2B. However, the number of elements stored in the buffer has been changed (relative to the scenario of FIG. 2A) by other threads, such that the buffer has become full. As illustrated in FIG. 2C, data is stored in all 8 elements of the buffer.

Similar to the scenario of FIG. 2B, the attempt to increase the value of the variable mSize will fail because the value of mSize is not equal to the read value of line 2. (This is assuming that the read occurred at an initial state such as that illustrated in FIG. 2A, for example.) The compare-and-swap operation will then set the variable size to be equal to the value of mSize (a value of 8, as illustrated in FIG. 2C). Because the updated value of size (8) is equal to capacity (8), the push operations of ALGORITHM 7 will end, and it will return a value (false) indicating that the buffer is full.

With reference back to FIG. 2A or 2B, if it is determined that available buffer space is guaranteed, a specific location for writing the data is then reserved. Unlike the stage described earlier, only two scenarios may be considered, as the possibility of a full buffer is no longer a concern. These two scenarios that are considered will be described with reference to FIGS. 3A and 3B.

Figure 3A:
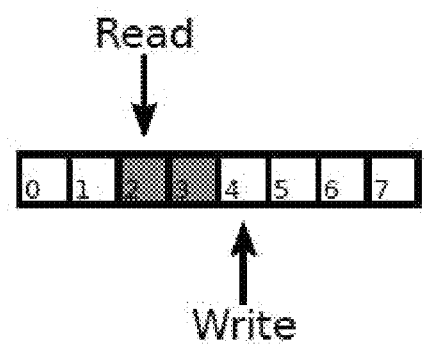
FIGS. 3A and 3B illustrate an example read/write configurations of a ring buffer.

FIG. 3A illustrates an example configuration. At line 11 of ALGORITHM 7, an index at which to write the data is reserved by performing an atomic load operation on the variable writeIndex with the value contained in the variable mWriteIndex. After reserving the index, an attempt is made to increment mWriteIndex in modular space for the next producer. According to at least one embodiment, the increment operation does not necessarily increase the value of the argument variable by one. For example, with reference to FIG. 3A, if the value of mWriteIndex is equal to 7 and the capacity of the buffer is 8, then the increment operation would cause mWriteIndex to loop to the other end of the buffer and, e.g., set the value of mWriteIndex to 0.

In the compare-and-swap operation of line 12, two scenarios may be considered, as noted earlier. First, if mWriteIndex is equal to writeIndex as read at line 11 (e.g., the configuration of FIG. 3A remains unchanged), then the operation proceeds: the compare-and-swap returns a value of true, and the value of mWriteIndex is successfully incremented in the modular space. With reference to FIG. 3A, if mWriteIndex is equal to writeIndex as read at line 11 (e.g., is equal to the expected value of 4, as illustrated in FIG. 3A), then the compare-and-swap returns a value of true, and the value of mWriteIndex is successfully incremented to a value of 5, for the next producer.

Figure 3B:
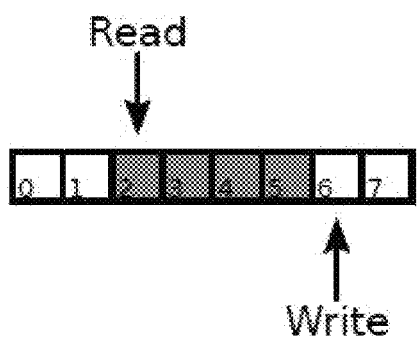

In the example of the previous paragraph, after the read operation at line 11 and before the compare-and-swap of line 12, the variable mWriteIndex is not incremented by any other thread(s). In contrast, it is possible that after the read operation at line 11, the thread is preempted by another thread that increments mWriteIndex. For example, FIG. 3B illustrates that another thread has written data into two additional elements of the buffer, relative to the configuration of FIG. 3A. In addition, the variable mWriteIndex has been incremented accordingly.

Here, the attempt to increment the write index in modular space will fail (in other words, the compare-and-swap operation at line 12 will return a value of false). This is because the value of mWriteIndex is not equal to the read value of line 11. For example, with reference to FIG. 3B, the value of mWriteIndex (6) is not equal to the value that was read at line 11 (4). The compare-and-swap operation will then set the variable writeIndex to be equal to the value of mWriteIndex. The while loop of lines 12-14 will continue looping until the thread succeeds in reserving an index.

Once a specific location for writing the data is reserved, operations are performed for ensuring that location denoted by the assigned index is ready for writing. In this regard, according to at least one embodiment, a three-state flag (or variable) is utilized. For example, the flag may carry any of three possible values: unoccupied; inTransition; and occupied. As will be described in more detail below with reference to lines 15-24 of ALGORITHM 7, the thread can proceed only if a particular array location is marked as being unoccupied.

Referring to ALGORITHM 7 at line 15, the variable populatedState is set to a value of unoccupied. At line 16, a compare-and-swap operation is used to check to determine whether the populated state of the location corresponding to writeIndex is equal to the expected value of unoccupied. This check is performed due to the possibility of another thread reserving the same index and writing data into the corresponding location. Therefore, the check at line 16 serves to ensure that the current thread can write data to that location in a thread-safe manner.

Also, an attempt is made to set the populated state to a value of inTransition. The populated state is set to this intermediate (or transitional) value because setting it to occupied may prematurely inform consumers that data at the location at issue is ready to be read.

The while loop of lines 16-25 is performed until the populated state of the location corresponding to writeIndex is equal to the expected value of "unoccupied." At line 24, the local variable populatedState is set to unoccupied because a failed compare-and-swap operation (see line 16) will either set this variable to be equal to occupied or inTransition. As noted earlier, the operations proceed only if the value of populatedState is unoccupied.

Because the read and write indices increase sequentially, it is guaranteed that as long as there is space (previously guaranteed), a consumer will eventually empty the requested array location, assuming the client is consuming as many values as having been produced.

As noted earlier, if a particular location is labeled as being occupied or inTransition, then it is not possible that another producer will modify data at that location. Also, if a particular location is labeled as being unoccupied or inTransition, then it is not possible that another consumer will read data from that location.

After determining that data can be written to the location in a thread-safe manner, the thread constructs data into (e.g., assigns data to) the node (see line 26 of ALGORITHM 7). According to at least one embodiment, data is constructed directly into the memory. For example, if an integer value is being stored, then the integer value is constructed directly into the memory. As another example, if a widget is being stored, then the widget is constructed directly into the memory. Such characteristics distinguish embodiments disclosed herein from an approach that operates on pointers and does not construct data directly into memory. Such an approach does not improve cache coherency, which may be of importance in transfer of data from a CPU to a GPU, and vice versa.

Figure 4:
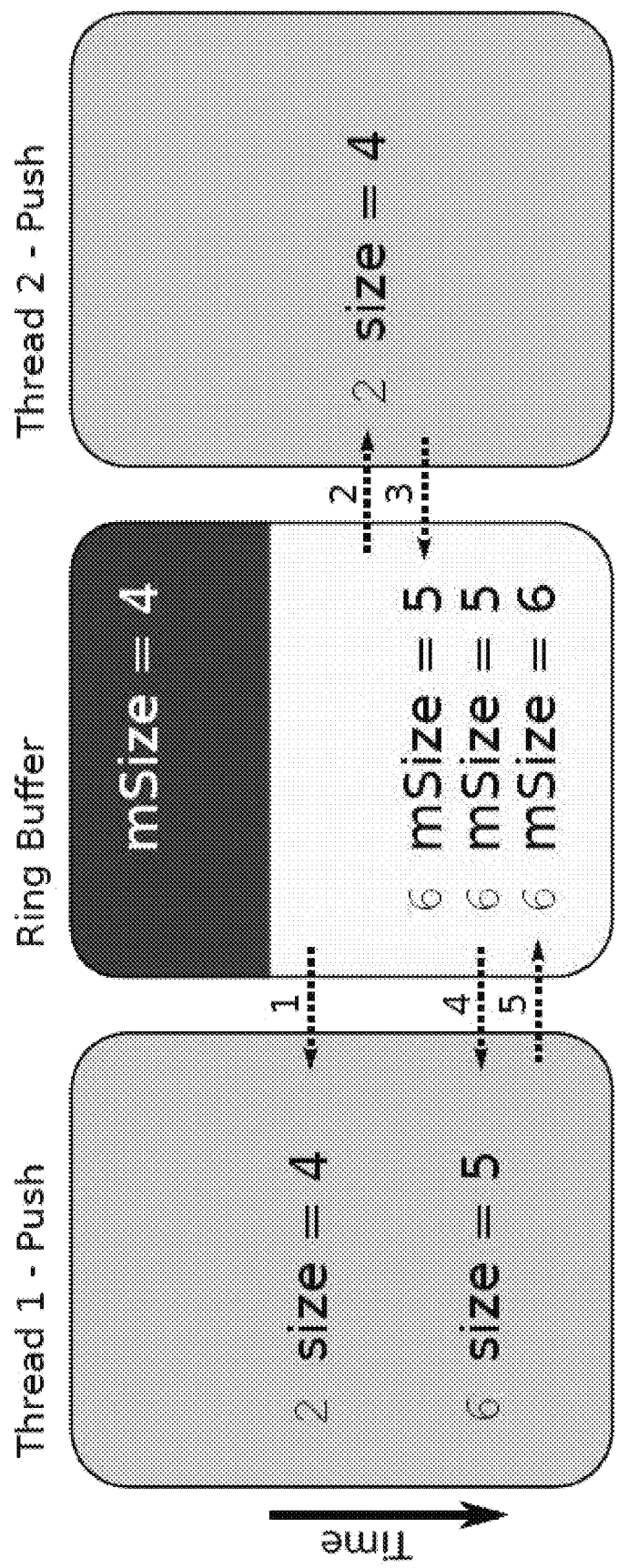
FIG. 4 illustrates a potential interaction between two producer threads.

FIG. 4 illustrates a potential interaction between two producer threads while trying to adjust the number of elements in the queue in ALGORITHM 7. Initially, the ring buffer has four elements. In interaction 1, Thread 1 reads from the buffer's mSize variable. In interaction 2, Thread 2 also reads a value of 4 from the buffer's mSize variable. In interaction 3, Thread 2 successfully performs a compare-and-swap, updating the buffer's mSize variable. Interaction 4 is a failed compare-and-swap for Thread 1, which updates the local size variable. In Interaction 5, Thread 1 successfully updates the buffer's mSize variable through compare-and-swap.

Figure 5A:
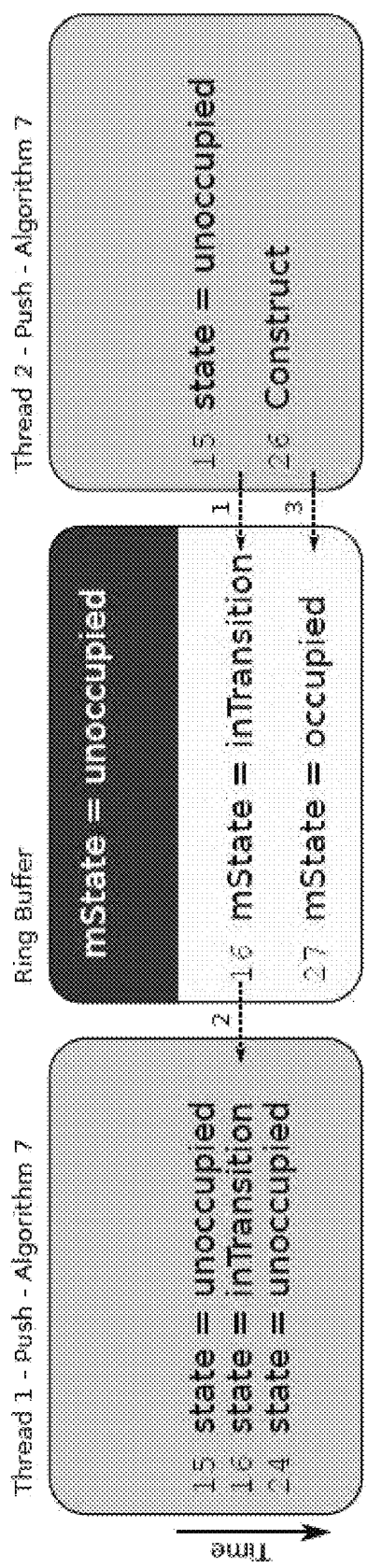
FIG. 5A illustrates a potential interaction between two producer threads.
Figure 5B:
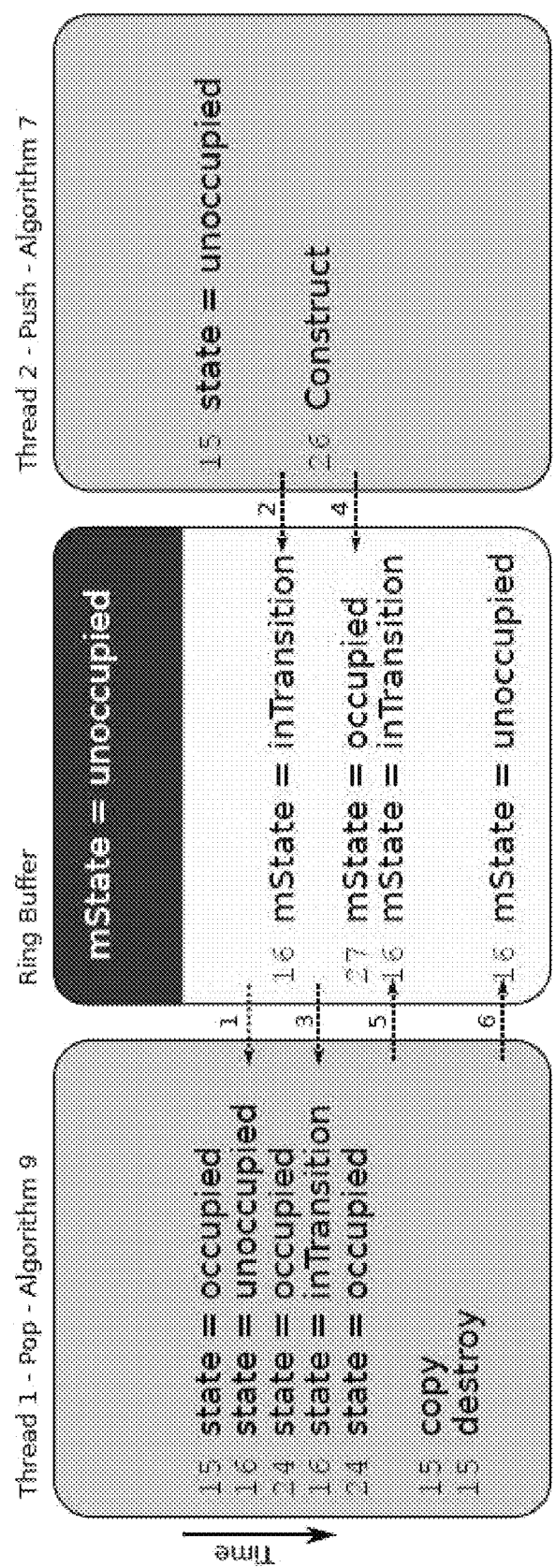
FIG. 5B illustrates a potential interaction between a producer thread and a consumer thread.

FIGS. 5A and 5B illustrate examples of potential interactions. For brevity, the populated state is denoted as "mState" in FIGS. 5A and 5B.

FIG. 5A illustrates a potential interaction between two producer threads while trying to claim privileges to write to the buffer. The buffer starts with the state at the reserved index as unoccupied. Both threads initially set their local variables to unoccupied in anticipation of the compare-and-swap. In interaction 1, Thread 2 successfully updates the buffer's state to inTransition. In interaction 2, Thread 1 performs a failed compare-and-swap, resulting in the local variable being updated to the value held by the buffer's mState variable, which is inTransition. In preparation to try the compare-and-swap again, Thread 1 sets its local state to unoccupied. Thread 1 will loop in this algorithm until it successfully claims the unoccupied slot. After Thread 2 constructs its data, it updates the state.

FIG. 5B demonstrates a potential interaction between a producer and a consumer thread while trying to access a buffer location. The buffer's mState is initially set to unoccupied. In preparation for their respective compare-and-swap functions, Thread 1 will set its local state variable to occupied, and Thread 2 will set its local state variable to unoccupied. In interaction 1, Thread 1's compare-and-swap fails, and its local state is set to the unoccupied value held by the buffer. In order to try again, it will set its local variable back to occupied. In interaction 2, Thread 2 is successful in updating the buffer's state to the transitional phase. In interaction 3, Thread 1 is again unsuccessful in the compare-and-swap, this time because the buffer is in transition. Once Thread 2 has constructed the object, it will set the buffer's state to occupied in interaction 4, allowing Thread 1 to claim the buffer's position successfully to consume the data. Regarding interaction 5, Thread 1 is now able to read from the buffer location. Thread 1 sets the buffer's state to inTransition in preparation to read the data. Once the data is consumed, it sets the buffer's state to unoccupied in interaction 6.

As illustrated at line 21 of ALGORITHM 7, a Yield( ) call is utilized. Since the thread is waiting after a failed compare-and-swap, the Yield( ) call gives up this thread's time-slice so that another thread can potentially update the populated-State at that index, allowing the original thread to proceed. The Yield( ) call allows other threads to consume the value at the desired slot and an option to make use of atomic waits for libraries that support them, such as the C++20 standard. In general, a blocking version of the push function can readily be written as a non-member function, thereby decreasing code coupling. Atomic waits make it necessary to write it as a member function, as in the pseudo-code of ALGORITHM 8 below, which illustrates an example of a blocking lock-free multi-producer/multi-consumer push function.

ALGORITHM 8: PushBlocking( ): A blocking lock-free multi-producer/multi-consumer ring buffer insertion.

```
1   PushBlocking(input)
2     repeat
3       pushed ← PushNonBlocking(input)
4       if not pushed then
5         compile-time-if supports atomic waits then
6           // For implementations that support atomic waits
7           // Wait until mSize is something other than capacity
8           AtomicWait(mSize, capacity)
9         else
10          Yield( )
11        endif
12      end
13    until pushed
```

An example of a lock-free multi-producer/multi-consumer pop function according to at least one embodiment is illustrated in the pseudo-code of ALGORITHM 9 below. Features of ALGORITHM 9 correspond to features of ALGORITHM 7, with some exceptions. For example, as described earlier, a check for a full buffer in a push function (see, e.g., line 3 of ALGORITHM 7) may be replaced with a check for an empty buffer in a pop function (see, e.g., line 3 of ALGORITHM 9). As another example, object construction in a push function (see, e.g., line 26 of ALGORITHM 7) may be replaced with object destruction in a pop function (see, e.g., line 27 of ALGORITHM 9).

As illustrated in the example of ALGORITHM 9, it is determined whether a ring buffer is empty (see, e.g., line 3 of ALGORITHM 9). If it is determined that the ring buffer is not empty, then an attempt is made to clear an element of the ring buffer storing data. For example, an attempt is made to decrement a variable corresponding to a number of stored elements in the ring buffer (see, e.g., line 6 of ALGORITHM 9). A specific location (index) of the ring buffer from which the data is to be read is reserved (see, e.g., lines 11-14 of ALGORITHM 9). Then, it is determined whether a state of the specific location is changed by at least one other computing thread (see, e.g., lines 16-22 of ALGORITHM 9). Similar to the example of ALGORITHM 7, a three-state flag (or variable) is utilized. For example, the flag may carry any of three possible values: unoccupied; inTransition; and occupied. If it is determined that the state of the specific location is not changed by at least one other computing thread, then the data is read from the specific location (see, e.g., line 26 of ALGORITHM 9).

| | ALGORITHM 9: A multi-producer/multi-consumer ring buffer pop function. |
|---|---|
| 1 | TryPop(output) |
| 2 |     size ← AtomicLoad(mSize) |
| 3 |     if size == 0 then |
| 4 |        return false |
| 5 |     end |
| 6 |     while not CAS(mSize, size, size −1) do |
| 7 |        if size == 0 then |
| 8 |           return false |
| 9 |        end |
| 10 |     end |
| 11 |     readIndex ← AtomicLoad(mReadIndex) |
| 12 |     while not CAS(mReadIndex, readIndex, Increment(readIndex)) do |
| 13 |        // No loop body |
| 14 |     end |
| 15 |     populatedState ← occupied |
| 16 |     while not CAS (mNodes[readIndex].populatedState, populatedState, inTransition) do |
| 17 |        compile-time-if supports atomic waits then |
| 18 |           // Wait for the occupied flag to change from what was read |
| 19 |           AtomicWait(mNodes[readIndex].populatedState, populatedState) |
| 20 |        else |
| 21 |           Yield ( ) |
| 22 |        endif |
| 23 |        // Only update when it is occupied |
| 24 |        populatedState ← occupied |
| 25 |     end |
| 26 |     output ← mNodes[readIndex] |
| 27 |     Destroy(mNodes[readIndex]) |
| 28 |     mNodes[readIndex].populatedState ← AtomicStore(unoccupied) |
| 29 |     compile-time-if supports atomic waits then |
| 30 |        // For implementations that support atomic waits |
| 31 |        AtomicNotifyAll(mSize) |
| 32 |        AtomicNotifyAll(mNodes[readIndex].populatedState) |
| 33 |     endif |
| 34 |     return true |

In ALGORITHM 7, the compare-and-swap operation at Line 16 may act as a spinlock. In situations where the active elements of the queue wrap around, this is a potential bottleneck: both producers and consumers may have to wait. For example, the object construction or copy may take an inordinate amount of time. In a sufficiently large queue, this may not be a performance factor. Even so, the compare-and-swap loop may be considered as breaking the expected behavior of a non-blocking algorithm: if a producer thread exits (perhaps by way of an exception), then a consumer may be caused to wait forever (or continuously) for the transition state to change. For example, if a producer thread sets the populated state of the location corresponding to writeIndex to inTransition and then exits (e.g., is suspended, or quits), then a consumer thread may be caused to wait an indeterminate amount of time for the state to change. In this manner, it may be said that progress of the consumer thread is blocked.

A non-blocking example of a lock-free multi-producer/multi-consumer ring buffer push function according to at least one embodiment is illustrated in the pseudo-code of ALGORITHM 10.

| | ALGORITHM 10: A lock-free non-blocking multi-producer/multi-consumer ring buffer push function. |
|---|---|
| 1 | TryPush(input) |
| 2 |     size ← AtomicLoad(mSize) |
| 3 |     if size == capacity then |
| 4 |        return false |
| 5 |     end |
| 6 |     while not CAS(mSize, size, size +1) do |
| 7 |        if size == capacity then |
| 8 |           return false |
| 9 |        end |
| 10 |     end |
| 11 |     Loop // Loop until return on success |
| 12 |        writeIndex ← AtomicLoad(mWriteIndex) |
| 13 |        while not CAS(mWriteIndex, writeIndex, Increment(writeIndex)) do |
| 14 |           // No loop body |
| 15 |        end |
| 16 |        populatedState ← unoccupied |
| 17 |        if CAS(mNodes[writeIndex].populatedState, populatedState, inTransition) then |
| 18 |           mNodes[writeIndex] ← Construct(input) |
| 19 |           mNodes[writeIndex].populatedState ← AtomicStore(occupied) |
| 20 |           compile-time-if supports atomic waits then |

ALGORITHM 10: A lock-free non-blocking multi-producer/multi-consumer ring buffer push function.

```
21   |   |   |         |       // For implementations that support atomic waits
22   |   |   |         |       AtomicNotifyAll(mSize)
23   |   |   |         |       AtomicNotifyAll(mNodes[writeIndex].populatedState)
24   |   |   |         endif
25   |   |   |         return true
26   |   |   end
27   |   EndLoop
```

As illustrated at line 17 of ALGORITHM 10, the compare-and-swap operation based on the populated state of a particular location appears as a condition in an if-then statement, rather than as a condition in a while loop (see, e.g., line 16 of ALGORITHM 7). As such, a consumer thread would not be caused to wait an indeterminate amount of time for the populated state of a location to change.

Because consumers are no longer waiting on the populated state, there is not a need to provide an atomic notification of the populated state. However, according to at least one embodiment, an atomic notification of mSize is provided, e.g., to support push and pop functions that wait for an appropriate number of elements in the queue instead of returning early.

If the consumers get ahead of the producers in the non-blocking functions, the consumer may loop over the entire length of the array. Profiling quickly-produced and quickly-consumed data did not show statistically significant differences in performance between the non-blocking algorithm (e.g., ALGORITHM 10) and ALGORITHM 7. However, approaches towards reducing this looping may be utilized. For example, one approach involves storing a set of indices that were skipped by consumers because of a producer in transition and visiting these indices first. The set of indices would also be lock-free. Another approach involves keeping track of a single index in thread-local storage to visit again. Another approach involves trying to limit the cardinality of the set of indices to visit based on the read and write indices. Such approaches may render the code more complex and cause performance to be slower, without reducing the number of iterations through the array compared to simpler approaches described earlier.

For purposes of completeness, a non-blocking example of a lock-free multi-producer/multi-consumer ring buffer pop function according to at least one embodiment is illustrated in the pseudo-code of ALGORITHM 11. The example of ALGORITHM 11 corresponds to the non-blocking example of ALGORITHM 10.

ALGORITHM 11: A lock-free non-blocking multi-producer/multi-consumer ring buffer pop fundion.

```
1    TryPop(output)
2    |   size ← AtomicLoad(mSize)
3    |   if size == 0 then
4    |   |   return false
5    |   end
6    |   while not CAS(mSize, size, size −1) do
7    |   |   if size == 0 then
8    |   |   |   return false
9    |   |   end
10   |   end
11   |   Loop // Loop until return on success
12   |   |   readIndex ← AtomicLoad(mReadIndex)
13   |   |   while not CAS(mReadIndex, readIndex, Increment(readIndex)) do
14   |   |   |   // No loop body
15   |   |   end
16   |   |   populatedState ← occupied
17   |   |   if CAS(mNodes[readIndex].populatedState, populatedState, inTransition) then
18   |   |   |   output ← mNodes[readIndex]
19   |   |   |   Destroy(mNodes[readIndex])
20   |   |   |   mNodes[readIndex].populatedState ← AtomicStore(unoccupied)
21   |   |   |   compile-time-if supports atomic waits then
22   |   |   |   |   // For implementations that support atomic waits
23   |   |   |   |   AtomicNotifyAll(mSize)
24   |   |   |   |   AtomicNotifyAll(mNodes[readIndex].populatedState)
25   |   |   |   endif
26   |   |   |   return true
27   |   |   end
28   |   EndLoop
```

Some architectures do not support exceptions. An exception is a problem that arises during the execution of a program. For example, in a C++ program, an exception is a response to an exceptional circumstance that arises while the program is running (e.g., an attempt to divide by zero). In an exception, a way to transfer control from one part of a program to another is provided. For example, a program throws an exception when a problem arises. This is done using a throw keyword. A program catches an exception with an exception handler at a place in a program where the problem is to be handled in some form. The catch keyword indicates the catching of an exception. A try block identifies a block of code for which particular exceptions may be activated. Such a try block may be followed by one or more catch blocks.

For purposes of description, features of at least one embodiment will be described with reference to a CPU implementation, as well as assumptions and definitions of exception-handling as laid out in the C++ language standard. For purposes of conciseness, the concept of finally has been borrowed from other languages to specify code that is executed whether or not an exception has been thrown.

Exception safety will be addressed to meet the definition of an obstruction-free algorithm, in which any partially completed operation can be aborted without stopping other threads from completing their work. The only exceptions that are possible are in these algorithms are in the construction and copying of objects: all of the atomic operations are guaranteed not to throw exceptions, and as in most of the C++ literature discussing exception safety, destructors are assumed not to throw exceptions.

The general robustness of C++ exception handling (from most robust to least) may be categorized as follows:

No-throw: An operation cannot throw an exception.

Strong: An operation can throw an exception, but the data structure is left in the same state as before the exception occurred. No data are lost.

Basic: An operation can throw an exception, and data structures are left in a well-defined state in which invariants are met; data may be lost.

No safety: No guarantees are made.

The C++ standard library prefers to separate operations that inspect elements of a data structure from operations that remove the element to ensure the strong exception guarantee (e.g., the C++ queue exposes front to access the first element, and pop which removes the first element without granting any access to the element). If an operation that involves the inspection throws an exception, the element still exists so that the client may try again. This separated framework is difficult to achieve in concurrent data structures, as the data may change between inspection and removal. Therefore, the ring buffer aims only to provide the basic exception guarantee during a TryPop operation: data structure invariants are met, and no resources are leaked, but information may be lost. The TryPush operation can meet the strong exception guarantee in principle: the queue is in a valid state, and no resources are leaked, but the internal state will not be the same as before the operation.

ALGORITHM 12: A lock-free non-blocking exception-safe multi-producer/multi-consumer ring buffer push function.

```
1   TryPush(input)
2   |  size ← AtomicLoad(mSize)
3   |  if size == capacity then
4   |  |  return false
5   |  end
6   |  while not CAS(mSize, size, size +1) do
7   |  |  if size == capacity then
8   |  |  |  return false
9   |  |  end
10  |  end
11  |  Loop // Loop until return on success
12  |  |  writeIndex ← AtomicLoad(mWriteIndex)
13  |  |  while not CAS(mWriteIndex, writeIndex, Increment(writeIndex)) do
14  |  |  |  // No loop body
15  |  |  end
16  |  |  populatedState ← unoccupied
17  |  |  if CAs(mNodes[writeIndex].populatedState, populatedState, in Transition) then
18  |  |  |  Try
19  |  |  |  |  mNodes[writeIndex] ← Construct(input) // Can throw an exception
20  |  |  |  |  mNodes[writeIndex].populatedState ← AtomicStore(occupied)
21  |  |  |  Catch
22  |  |  |  |  mNodes[writeIndex].populatedState ← AtomicStore(exception)
23  |  |  |  |  throw // Re-throw exception
24  |  |  |  Finally
25  |  |  |  |  compile-time-if supports atomic waits then
26  |  |  |  |  |  // For implementations that support atomic waits
27  |  |  |  |  |  AtomicNotifyAll (mSize)
28  |  |  |  |  |  AtomicNotifyAll( mNodes[writeIndex].populatedState)
29  |  |  |  |  endif
30  |  |  |  EndTry
31  |  |  |  return true
32  |  |  end
33  |  EndLoop
```

An example of a lock-free non-blocking exception-safe multi-producer/multi-consumer ring buffer push function according to at least one embodiment is illustrated in the pseudo-code of ALGORITHM 12. There, in line 2, the variable mSize is read and stored in size. If size is equal to the capacity of the buffer, then the TryPush( ) function fails and returns false. Otherwise, at line 6, an attempt is made to increase the value of the variable mSize by 1. A successful attempt would indicate that the buffer was not previously full, and that it is guaranteed that there is space in the buffer for the new data that is to be written, but if size is equal to capacity then TryPush( ) returns false. Assuming additional capacity can be reserved, at line 11, the operation will loop until TryPush( ) succeeds (or an exception is thrown). Within the loop operation, at line 12, mWriteIndex is read and loaded into writeIndex. At line 13, a compare-and-swap is performed to increment the mWriteIndex in order to reserve the next write index to which the input is to be written. At line 16, the populatedState is set to unoccupied, and at line 17, compare-and-swap is performed on the populatedState associated with the mWriteIndex and the populatedState. Assuming the values are both set to unoccupied, the compare-and-swap succeeds and the populatedState associated with the mWriteIndex is set to inTransition to prepare for data to be written. At line 18, a try block is executed, which constructs the input into the ring buffer at the location indicated by the writeIndex. If construct is successful, the populatedState at the writeIndex location of the ring buffer will be set to the occupied state. In some instances, an exception may be thrown in an object's constructor (or object's construct operation for consistency). If that happens, the catch block at line 21 will handle the exception by updating the populatedState at the writeIndex of the ring buffer to exception, indicating that an exception was thrown with respect to that ring buffer location. The exception status indicates to consumers not to pop data from this particular location. The catch block will then re-throw the exception to indicate to the user that an exception was thrown and for the user to handle the exception. At line 24, regardless of whether the catch block was executed, the finally block is executed to notify other threads of that the current value or state of mSize and the populatedState at the writeIndex location of the ring buffer is up to date.

An example of a lock-free non-blocking exception-safe multi-producer/multi-consumer ring buffer pop function according to at least one embodiment is illustrated in the pseudo-code of ALGORITHM 13. There, at line 2, the value of mSize is read into the variable size, and at line 3, if the value of size is 0 (i.e., the ring buffer is empty), then the TryPop( ) operation will end. Assuming the buffer is not empty, at line 6, a compare-and-swap operation is performed to decrement the value of mSize by 1. At line 6, in case another thread modified the value of size in the interim, another check is performed on size to ensure that the ring buffer is not empty. If mSize is successfully decreased by 1, then at line 11, a loop operation commences and code within the loop operation may execute until data is successfully popped (or an exception occurs). At line 12, the value of mReadIndex is read into the variable readIndex. At line 13, a compare-and-swap to increment the value of mreadIndex by 1 is attempted until successful. Assuming the mreadIndex is successfully incremented, at line 16, the populatedState is set to occupied. At line 17, a compare-and-swap is performed to confirm that the value of the populatedState at the readIndex of the ring buffer is the same (occupied) as the value of the populatedState, and if so, the state is then set to inTransition for reading to prevent another thread from reading and writing to the same location. Assuming the compare-and-swap is successful, at line 18, a try block is executed to read (or assign) the value of the ring buffer at the readIndex to the variable output. If the assignment is successful, the value of the ring buffer at the readIndex is destroyed (e.g., deleted and reset to a default value such as null or 0). In some instances, reading the ring buffer at the readIndex location may lead to an exception. When an exception is thrown, the user may handle the exception. But regardless of whether an exception is thrown, unlike in ALGORITHM 12 where exception handling is performed in a catch block, no catch block is needed for ALGORITHM 13, since the algorithm will, at the finally block beginning on line 21, set the populatedState of the ring buffer at the readIndex to unoccupied, allowing another value to be written to it, regardless of whether an exception occurred. Subsequently, at lines 25 and 26, other threads may be notified that the mSize and the populatedState of the ring buffer at the readIndex are up to date.

Turning to line 30, in the event that the compare-and-swap at line 17 was unsuccessful, and the populatedState variable is set to exception, the value of the populatedState of the ring buffer at the readIndex location would be set to unoccupied, effectively resetting the status for other threads to write to the location.

An advantage of ALGORITHMS 12 and 13 over ALGORITHMS 7 and 9, is that ALGORITHMS 12 and 13 are truly lock-free and non-blocking in the event of an exception. Since ALGORITHMS 7 and 9 do not perform exception handling, should one occur, ALGORITHMS 7 and 9 may result in the code or memory being locked or blocked for use by other threads.

A state to signify that the producer has thrown an exception while adding to the queue location has been added to the populated state variable (see ALGORITHM 12, Line 22). This state is utilized in order to keep the size invariant intact. Without this state, if the constructor in the producer's TryPush function threw an exception, the array location would have to be marked as unoccupied, and the previously incremented size would have to be decremented. However, decrementing the size is not possible: consumers work under the assumption that the size is an accurate representation of the number of elements available (or soon to be available) and may have already decremented the count. Instead of modifying the size, the initial size manipulation behavior is left in place, and if a consumer encounters a slot that was not filled due to an exception, it frees the slot and returns early, allowing the client code to try again (see ALGORITHM 13, Line 30).

---

ALGORITHM 13: A lock-free non-blocking multi-producer/multi-consumer ring buffer pop function.

```
1  TryPop (output)
2  |  size ← AtomicLoad(mSize)
3  |  if size == then
4  |  |  return false
5  |  end
6  |  while not CAS(mSize, size, size −1) do
```

ALGORITHM 13: A lock-free non-blocking multi-producer/multi-consumer ring buffer pop function.

```
7        |    if size == 0 then
8        |    |    return false
9        |    end
10   |  end
11   |  Loop // Loop until return on success
12   |    |  readIndex ← AtomicLoad(mReadIndex)
13   |    |  while not CAS(mReadIndex, readIndex, Increment(readIndex)) do
14   |    |    |  // No loop body
15   |    |  end
16   |    |  populatedState ← occupied
17   |    |  if CAS(mNodes[readIndex].populatedState, populatedState, inTransition) then
18   |    |    |  Try
19   |    |    |    |  output ← mNodes[readIndex] // Can throw an exception, which is allowed to escape
20   |    |    |    |  Destroy(mNodes[readIndex])
21   |    |    |  Finally
22   |    |    |    |  mNodes[readIndex].populatedState ← AtomicStore(occupied)
23   |    |    |    |  compile-time-if supports atomic waits then
24   |    |    |    |    |  // For implementations that support atomic waits
25   |    |    |    |    |  AtomicNotifyAll(mSize)
26   |    |    |    |    |  AtomicNotifyAll(mNodes[readIndex].populated.State)
27   |    |    |    |  endif
28   |    |    |  EndTry
29   |    |    |  return true
30   |    |  else if populatedState == exception then
31   |    |    |  mNodes[readIndex].populatedState ← AtomicStore(unoccupied)
32   |    |    |  compile-time-if supports atomic waits then
33   |    |    |    |  // For implementations that support atomic waits
34   |    |    |    |  AtomicNotifyAll(mSize)
35   |    |    |    |  AtomicNotifyAll(mNodes[readIndex].populatedState)
36   |    |    |  endif
37   |    |    |  return false
38   |    |  end
39   |  EndLoop
```

While most of the exception framework is specific to the CPU, a GPU consumer may need to be aware of the additional exception state to handle exceptions generated on a CPU producer.

Some efficiency gains can be had when there is a single producer or a single consumer, and even more gains can be had when a single producer adds more than one element at once to the queue. However, these gains may be relatively small with regards to atomic operations being reduced, or memory fences being relaxed. The actual efficiency of batch element enqueuing comes when the buffer is used to communicate to the GPU, as the number of memory transfers can be reduced.

An example of a lock-free single-producer/multi-consumer push function according to at least one embodiment is illustrated in the pseudo-code of ALGORITHM 14 below.

ALGORITHM 14: A single-producer/multi-consumer ring buffer insertion.

```
1   TryPushSingle(input)
2   |  // This is the only writer: mSize will only decrease
3   |  if AtomicLoad(mSize) == capacity then
4   |    |  return false
5   |  end
6   |  mSize ← AtomicAdd (1)
7   |  // Assuming this is always the only producer, no need to atomically modify mWriteIndex
8   |  writeIndex ← mWriteIndex
9   |  mWriteIndex ← Increment(mWriteIndex)
10  |  populatedState ← unoccupied
11  |  while not CAS(mNodes[writeIndex].populatedState, populatedState, inTransition) do
12  |    |  compile-time-if supports atomic waits then
13  |    |    |  // Wait for the occupied flag to change from what was read
14  |    |    |  AtomicWait(mNodes[writeIndex].populatedState, populatedState)
15  |    |  else
16  |    |    |  Yield ( )
17  |    |  endif
18  |    |  // Only update when it is unoccupied
19  |    |  populatedState ← unoccupied
```

ALGORITHM 14: A single-producer/multi-consumer ring buffer insertion.

```
20      |   end
21      |   mNodes[writeIndex] ← Construct(input)
22      |   mNodes[writeIndex].populatedState ← AtomicStore(occupied)
23      |   compile-time-if supports atomic waits then
24      |   |       // For implementations that support atomic waits
25      |   |       AtomicNotifyOne(mSize)
26      |   |       AtomicNotifyOne(mNodes[writeIndex].populatedState)
27      |   endif
28      |   return true
```

The pseudo-code of ALGORITHM 14 illustrates an example modification of the push function when using only one producer. The check for fullness is simplified because there are no other producers that could lead to the buffer being full. Because the single producer is the only thread that accesses mWriteIndex, atomic operations are unnecessary (or a relaxed memory model can be used). Also, regarding atomic wait support, only one thread has to be notified because all other threads are consumers.

An example of a lock-free single-producer/multi-consumer batch insertion function according to at least one embodiment is illustrated in the pseudo-code of ALGORITHM 15 below.

of ALGORITHM 15 involves fewer atomic operations. Further, the number of copy calls from the CPU to the GPU is minimized (or at least reduced). The behavior is slightly different in that case: aside from either copying the data or perhaps giving the GPU hints in the case of a unified memory model, waiting atomic variables are either notified one-by-one as data becomes available, or all of them are notified at the end when memory has been propagated. According to at least one embodiment, care is taken in copying the memory as it may be in one large contiguous chunk or two (or more) smaller chunks, depending on ring buffer wrapping.

ALGORITHM 15: A single-producer/multi-consumer ring buffer batch insertion.

```
1   TryPushSingleBatch(input, elementCount)
2   |   // This is the only writer: mSize will only decrease
3   |   if AtomicLoad(mSize) + elementCount > capacity then
4   |   |       return false
5   |   end
6   |   mSize ← AtomicAdd (elementCount)
7   |   // Assuming this is always the only producer, no need to atomically modify mWriteIndex
8   |   foreach element e in input do
9   |   |       writeIndex ← mWriteIndex
10  |   |       mWriteIndex ← Increment(mWriteIndex)
11  |   |       populatedState ← unoccupied
12  |   |       while not CAS(mNodes[writeIndex].populatedState, populatedState, in Transition) do
13  |   |       |       compile-time-if supports atomic waits then
14  |   |       |       |       // Wait for the occupied flag to change from what was read
15  |   |       |       |       AtomicWait(mNodes[writeIndex].populatedState, populatedState)
16  |   |       |       else
17  |   |       |       |       Yield ( )
18  |   |       |       endif
19  |   |       |       // Only update when it is unoccupied
20  |   |       |       populatedState ← unoccupied
21  |   |       end
22  |   |       mNodes[writeIndex] ← Construct(e)
23  |   |       mNodes[writeIndex].populatedState ← AtomicStore(occupied)
24  |   |       compile-time-if supports atomic waits then
25  |   |       |       // For implementations that support atomic waits
26  |   |       |       if pushing from CPU to CPU then
27  |   |       |       |       AtomicNotifyOne(mSize)
28  |   |       |       |       AtomicNotifyOne(mNodes[writeIndex].populatedState)
29  |   |       |       end
30  |   |       endif
31  |   end
32  |   if communicating betweenn CPU and GPU then
33  |   |       copyMemoryBetweenDevices( ) // If necessary
34  |   |       compile-time-if supports atomic waits then
35  |   |       |       // For implementations that support atomic waits
36  |   |       |       AtomicNotifyAll(mSize)
37  |   |       |       AtomicNotifyAll(mNodes[writeIndex].populatedState)
38  |   |       endif
39  |   end
40  |   return true
```

The pseudo-code of ALGORITHM 15 illustrates an example batch insertion for single producers. Relative to the example pseudo-code of ALGORITHM 14, the pseudo-code Performance of at least one embodiment was measured for the CPU implementation on an x86-64 machine with 36 physical cores and hardware support for 72 virtual cores.

Measurements were taken against an optimized locking version of the queue. To not measure time spent waiting for conditions to be met (i.e., a full or an empty buffer), the producers aimed to keep the queue at 75% capacity. The time measured was time spent only in the push and pop functions. Only even total numbers of threads were used, and thread counts were the same between producers and consumers. For example, there is a run with 29 producer threads and 29 consumer threads. The overall workload between runs is the same: as thread counts increase, each thread does less work.

Figure 6:
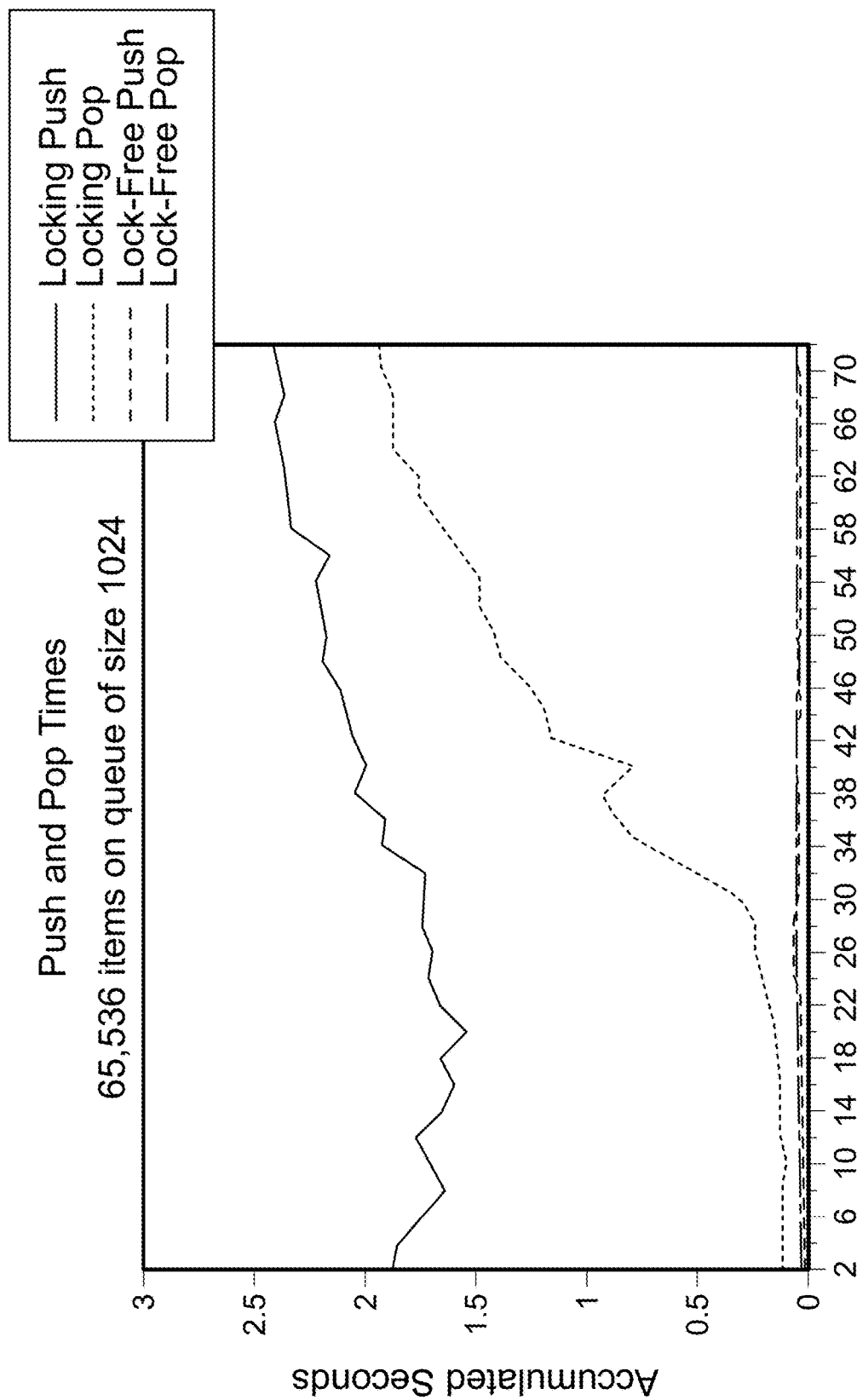
FIG. 6 is a graph showing accumulated times threads spent in pushing or popping operations.
Figure 7:
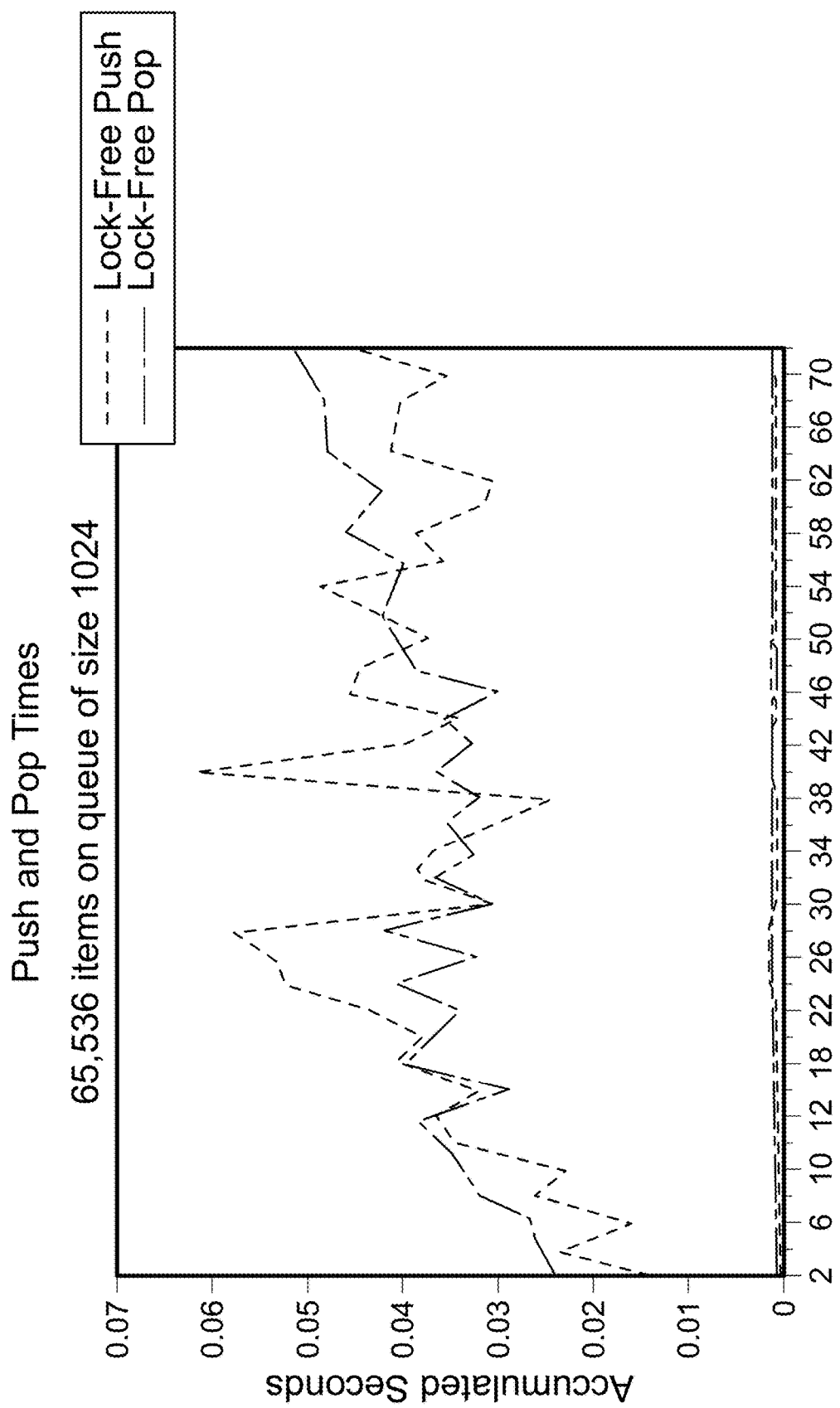
FIG. 7 is a graph showing, in finer resolution, accumulated times threads spent in pushing or popping operations on a lock-free buffer.

FIG. 6 shows the accumulated times threads spent in pushing or popping operations. The graph clearly shows that the time spent on pushing and popping in the locking queue increase as the number of threads contend for mutual exclusion, even as the overall application run-time decreases (not shown). The lock-free queue is not immune to such contention, as is shown in FIG. 7, which has only the data from FIG. 6 for the lock-free queue. On average, the locking queue's overhead for pushing grows by 0.80% and for popping by 9.66% for each pair of threads added, while the lock-free queue's pushing overhead grows by 8.30% while its popping grows by 3.24% on average.

A benefit of utilizing a ring buffer is that dynamic allocation is not required. As such, memory need not be allocated repeatedly, which improves efficiency. Also, in many contexts, it may provide improved cache coherency—for example, when going from CPU to CPU, where there is memory fragmentation Another benefit of utilizing a ring buffer can be observed in the context of going from CPU to GPU, or vice versa. Regarding the CPU, threads will all act in the same memory space, and can all access the same memory, e.g., of a particular computer. However, the GPU has its own bank of memory. As such, when the CPU and the GPU communicate with one another, they send data over a bus (e.g., PCI bus), but they are required to share memory. If a ring buffer is to be shared between the CPU and the GPU, the ring buffer would need to be copied. Depending on the API that is in use, the copy can be transparent, or it can be an explicit copy. With regards to copying, efficiency is enhanced when a contiguous block of memory is copied, as opposed to copying separately allocated blocks of memory.

Figure 8:
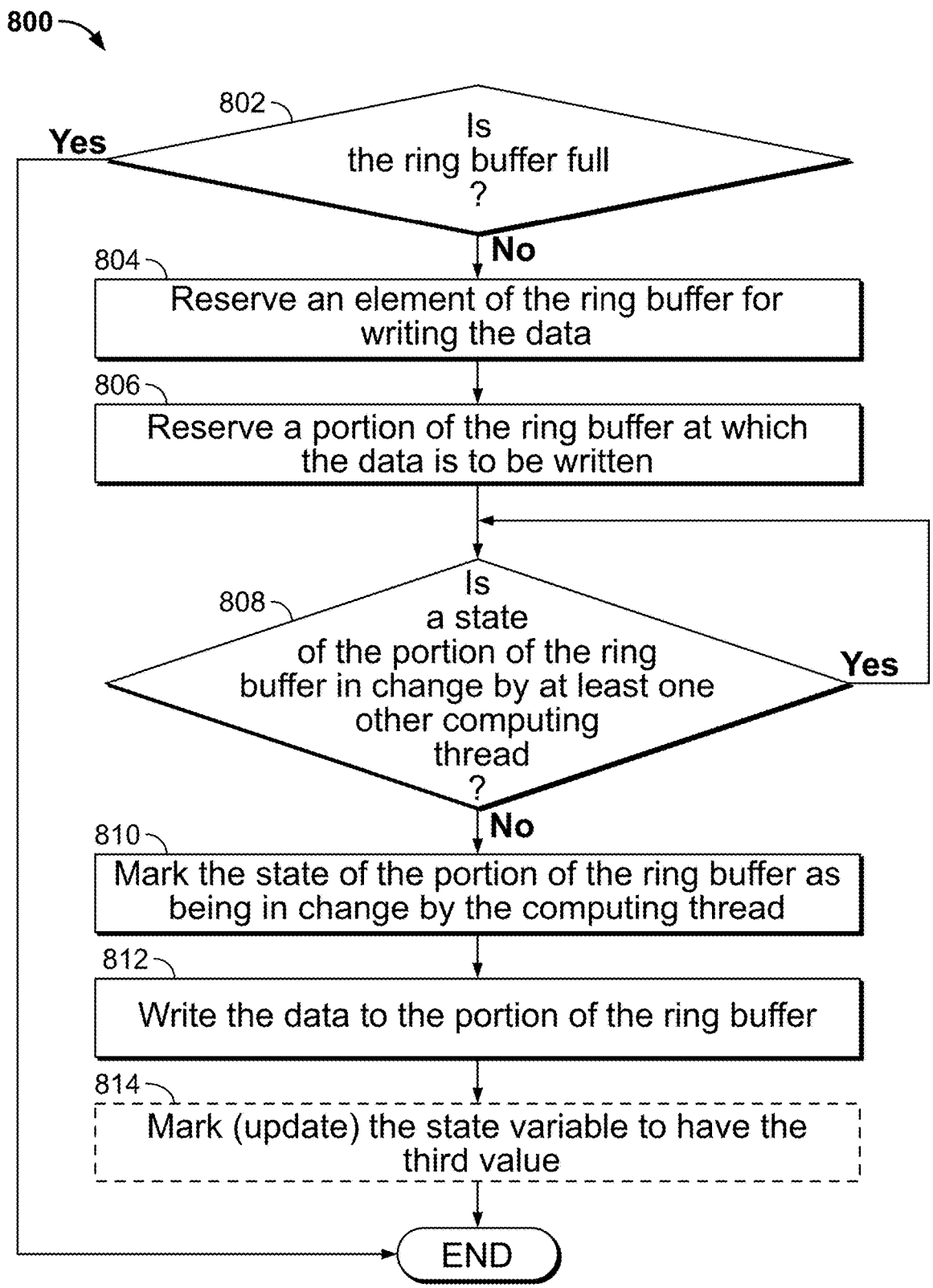
FIG. 8 is a flowchart illustrating a method writing, by a computing thread, data to a ring buffer according to at least one embodiment.

FIG. 8 illustrates a flowchart of a method 800 of writing, by a computing thread, data to a ring buffer according to at least one embodiment.

At block 802, it is determined whether the ring buffer is full. If it is determined that the ring buffer is full, then the method 800 ends. If it is determined that the ring buffer is not full, then the method 800 proceeds to block 804.

According to at least one further embodiment, determining whether the ring buffer is full is based on an atomic variable that represents the number of stored elements in the ring buffer.

For example, as described earlier with reference to FIG. 2A, it is determined that a buffer (e.g., ring buffer) is not full. The determination may be based on the variable mSize (see, e.g., ALGORITHM 7, lines 2-5).

At block 804, an element of the ring buffer for writing the data is reserved. Reserving the element includes incrementing a size variable corresponding to a number of stored elements in the ring buffer.

For example, as described earlier with reference to FIG. 3A, an index at which to write the data is reserved by performing an atomic load operation on the variable writeIndex with the value contained in the variable mWriteIndex. After reserving the index, an attempt is made to increment mWriteIndex in modular space for the next producer (see, e.g., ALGORITHM 7, lines 11-14).

At block 806, a portion of the ring buffer at which the data is to be written is reserved.

According to a further embodiment, the portion of the ring buffer includes a plurality of elements associated with the ring buffer. Reserving the portion of the ring buffer may include reserving each element of the plurality of elements such that each element corresponds to a different index of the ring buffer.

For example, as illustrated in FIG. 3A, a portion of the ring buffer may include elements (denoted as) having respective indices of 4, 5, 6, etc. Reserving the portion of the ring buffer may include reserving each of such elements such that each element corresponds to a different index.

At block 808, it is determined whether a state of the portion of the ring buffer is in change by at least one other computing thread. If it is determined that the state of the portion of the ring buffer is in change by at least one other computing thread, then the method 800 may return to block 808 for another determination, for example, at a later time (see, for example, ALGORITHM 7). Alternatively, the method 800 may return to block 806 (see, for example, ALGORITHM 10). If it is determined that the state of the portion of the ring buffer is not in change by at least one other computing thread, then the method 800 proceeds to block 810.

According to a further embodiment, determining whether the state of the portion is in change by the at least one other computing thread includes determining whether a state of each element of the plurality of elements is in change by at least one other computer thread.

According to a further embodiment, determining whether the state of the portion of the ring buffer is in change by the at least one other computing thread is based on a state variable having one of at least three values.

By way of example, a first value of the state variable may correspond to an unoccupied state, a second value of the state variable may correspond to an in-transition state, and a third value of the state variable may correspond to an occupied state.

For example, as described earlier with reference to ALGORITHM 7, lines 15-24, operations are performed for ensuring that a location denoted by an assigned index is ready for writing. In this regard, a three-state flag (or variable) is utilized. For example, the flag may carry any of three possible values: unoccupied; inTransition; and occupied. A thread can proceed only if a particular array location is marked as being unoccupied.

At block 810, the state of the portion of the ring buffer is marked as being in change by the computing thread.

According to a further embodiment, marking the state of the portion of the ring buffer as being in change by the computing thread may include marking (updating) the state variable to have the second value.

According to a further embodiment, the portion of the ring buffer includes a plurality of elements associated with the ring buffer. Marking the state of the portion of the ring buffer as being in change by the computing thread may include marking (updating) the state variable of a corresponding at least one element of the plurality of elements to have the second value.

For example, as described earlier with reference to ALGORITHM 7, line 16, an attempt is made to set the populated state to a value of inTransition. The populated state is set to this intermediate (or transitional) value because setting it to occupied may prematurely inform consumers that data at the location at issue is ready to be read.

At block 812, the data is written to the portion of the ring buffer.

According to a further embodiment, writing the data to the portion of the ring buffer includes writing a respective subset of the data to the corresponding at least one element of the plurality of elements.

For example, as described earlier with reference to ALGORITHM 7, line 26, the thread constructs data into (e.g., assigns data to) the node. The data may be constructed directly into the memory.

At block 814, the state variable may be marked (or updated) to have the third value.

For example, the populated state is set to a value of occupied (see, e.g., ALGORITHM 7, line 25).

Figure 9:
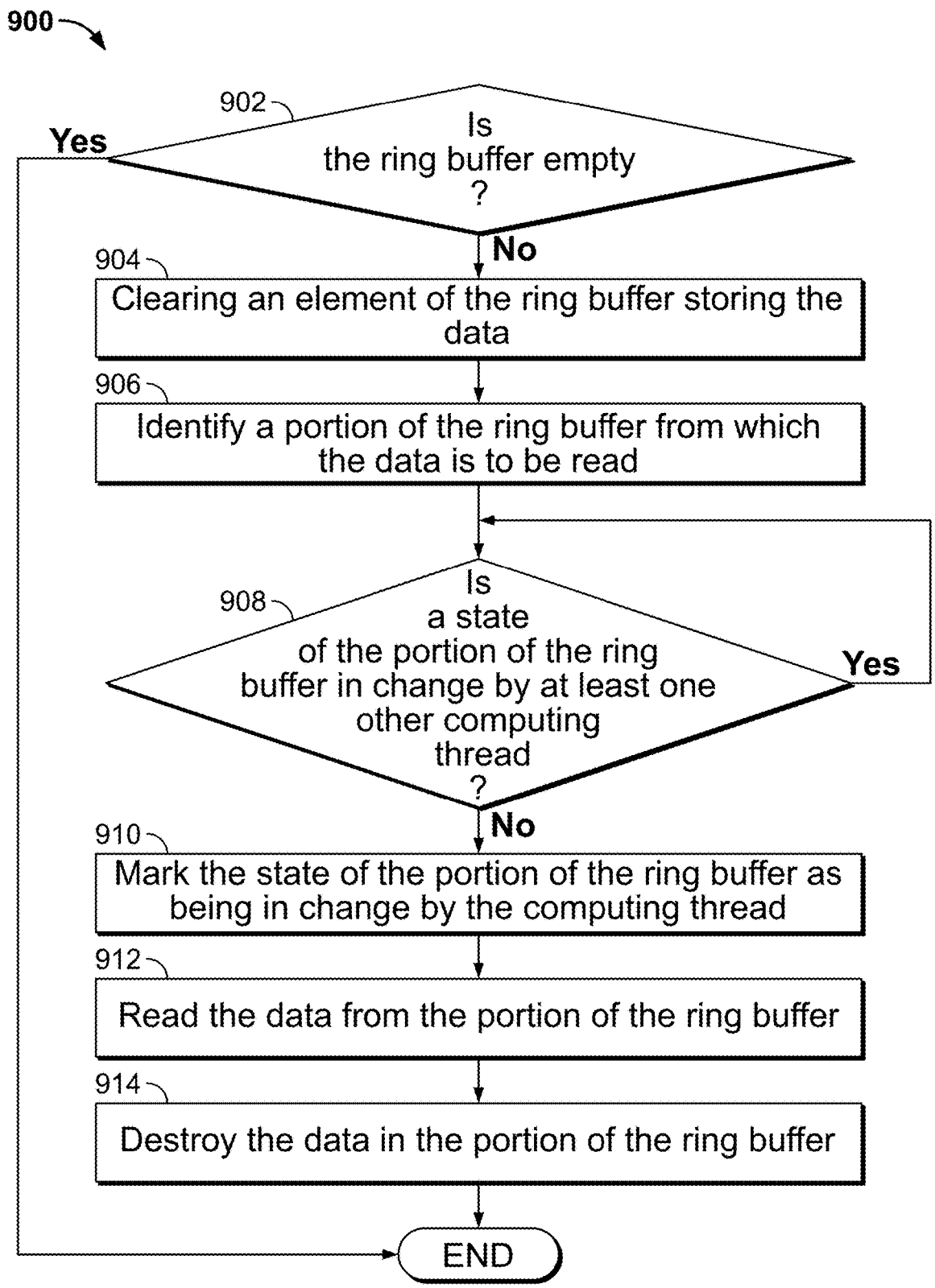
FIG. 9 is a flowchart illustrating a method of reading, by a computing thread, data from a ring buffer according to at least one embodiment.

FIG. 9 illustrates a flowchart of a method 900 of reading, by a computing thread, data from a ring buffer according to at least one embodiment.

At block 902, it is determined whether the ring buffer is empty. If it is determined that the ring buffer is empty, then the method 900 ends. If it is determined that the ring buffer is not empty, then the method 900 proceeds to block 904.

According to at least one further embodiment, determining whether the ring buffer is empty is based on an atomic variable that represents the number of stored elements in the ring buffer.

For example, as described earlier with reference to ALGORITHM 9, it is determined whether a buffer (e.g., ring buffer) is empty. The determination may be based on the variable mSize (see, e.g., ALGORITHM 9, lines 2-5).

At block 904, an element of the ring buffer storing the data is cleared. Clearing the element includes decrementing a size variable corresponding to a number of stored elements in the ring buffer.

For example, as described earlier with reference to ALGORITHM 9, an attempt is made to decrement a variable corresponding to a number of stored elements in the ring buffer (see, e.g., line 6 of ALGORITHM 9).

At block 906, a portion of the ring buffer from which the data is to be read is identified.

For example, as described earlier with reference to ALGORITHM 9, lines 11-14, a specific location (index) of the ring buffer from which the data is to be read is reserved At block 908, it is determined whether a state of the portion of the ring buffer is in change by at least one other computing thread. If it is determined that the state of the portion of the ring buffer is in change by at least one other computing thread, then the method 900 may return to block 908 for another determination, for example, at a later time (see, for example, ALGORITHM 9). Alternatively, the method 900 may return to block 906 (see, for example, ALGORITHM 11). If it is determined that the state of the portion of the ring buffer is not in change by at least one other computing thread, then the method 900 proceeds to block 910.

For example, with reference to ALGORITHM 9, lines 16-22, it is determined whether a state of the specific location is changed at least one other computing thread. In this regard, a three-state flag (or variable) is utilized. For example, the flag may carry any of three possible values: unoccupied; inTransition; and occupied. A thread can proceed only if a particular array location is marked as being occupied.

At block 910, the state of the portion of the ring buffer is marked as being in change by the computing thread.

For example, with reference to ALGORITHM 9, line 16, an attempt is made to set the populated state to a value of inTransition.

At block 912, the data is read from the portion of the ring buffer.

For example, as described earlier with reference to ALGORITHM 9, line 26, the thread reads data from the specific location.

At block 914, the data at the portion of the ring buffer is destroyed (see, e.g., ALGORITHM 9, line 27).

Figure 10:
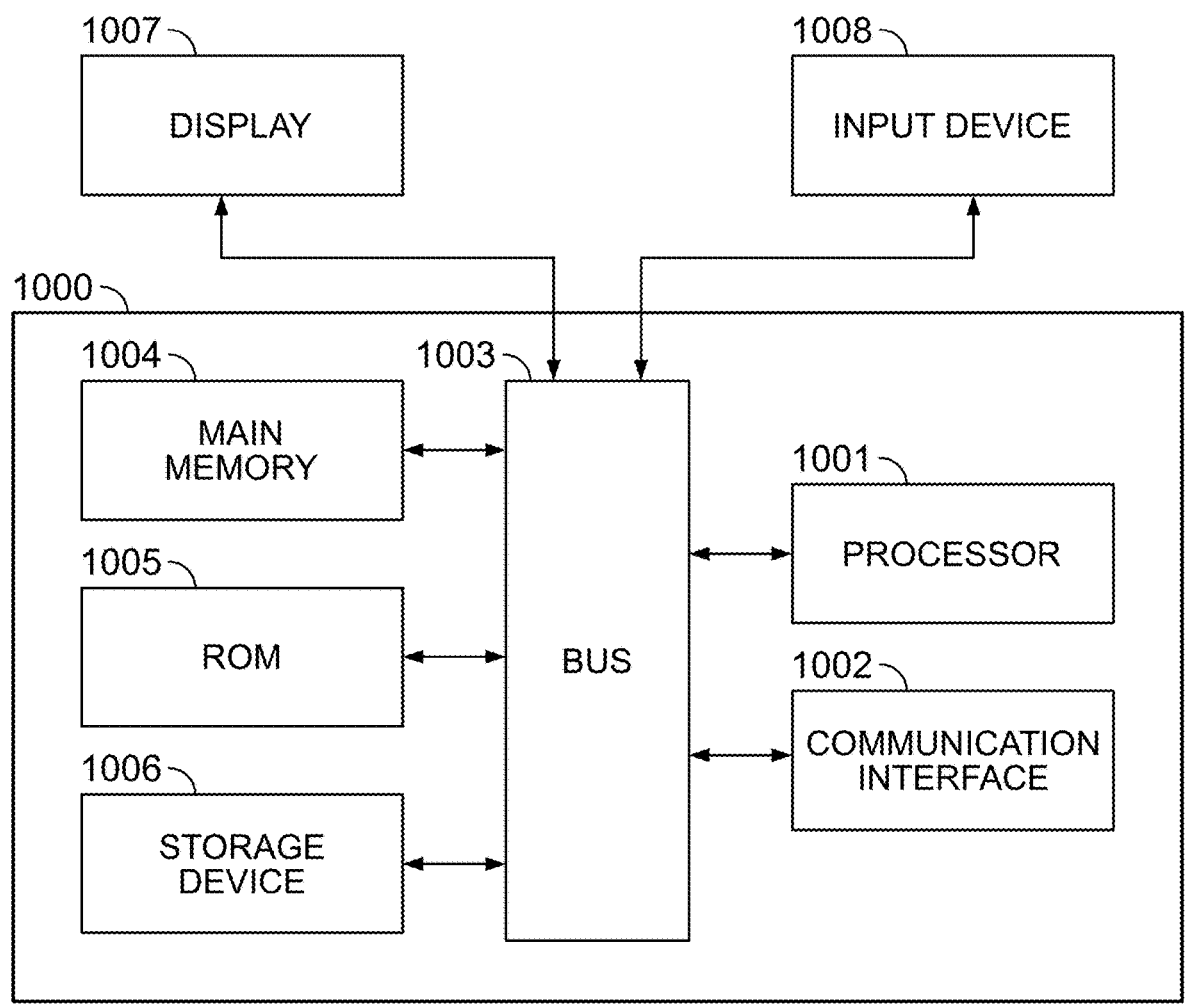
FIG. 10 is a block diagram of a device according to at least one embodiment.

Referring to FIG. 10, an illustration of an example computer 1000 is provided. Features of various embodiments discussed herein (for example, features discussed with reference the methods 800, 900) may be implemented at a computer 1000 (or at a system including the computer 1000). In selected embodiments, the computer 1000 may include a bus 1003 (or multiple buses) or other communication mechanism, a processor 1001, main memory 1004, read only memory (ROM) 1005, one or more additional storage devices 1006, and/or a communication interface 1002, or the like or sub-combinations thereof. The embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In all embodiments, the various components described herein may be implemented as a single component, or alternatively may be implemented in various separate components.

A bus 1003 or other communication mechanism, including multiple such buses or mechanisms, may support communication of information within the computer 1000. The processor 1001 may be connected to the bus 1003 and process information. In selected embodiments, the processor 1001 may be a specialized or dedicated microprocessor configured to perform particular tasks in accordance with the features and aspects disclosed herein by executing machine-readable software code defining the particular tasks. Main memory 1004 (e.g., random access memory—or RAM—or other dynamic storage device) may be connected to the bus 1003 and store information and instructions to be executed by the processor 1001. Main memory 1004 may also store temporary variables or other intermediate information during execution of such instructions.

ROM 1005 or some other static storage device may be connected to a bus 1003 and store static information and instructions for the processor 1001. An additional storage device 1006 (e.g., a magnetic disk, optical disk, memory card, or the like) may be connected to the bus 1003. The main memory 1004, ROM 1005, and the additional storage device 1006 may include a non-transitory computer-readable medium holding information, instructions, or some combination thereof, for example instructions that when executed by the processor 1001, cause the computer 1000 to perform one or more operations of a method as described herein. A communication interface 1002 may also be connected to the bus 1003. A communication interface 1002 may provide or support two-way data communication between a computer 1000 and one or more external devices (e.g., other devices contained within the computing environment).

In selected embodiments, the computer 1000 may be connected (e.g., via a bus) to a display 1007. The display 1007 may use any suitable mechanism to communicate information to a user of a computer 1000. For example, the display 1007 may include or utilize a liquid crystal display (LCD), light emitting diode (LED) display, projector, or other display device to present information to a user of the computer 1000 in a visual display. One or more input devices 1008 (e.g., an alphanumeric keyboard, mouse, microphone, stylus pen) may be connected to the bus 1003 to communicate information and commands to the computer 1000. In selected embodiments, one input device 1008 may provide or support control over the positioning of a cursor to allow for selection and execution of various objects, files, programs, and the like provided by the computer 1000 and displayed by the display 1007.

The computer 1000 may be used to transmit, receive, decode, display, or the like one or more video files. In selected embodiments, such transmitting, receiving, decoding, and displaying may be in response to the processor 1001 executing one or more sequences of one or more instructions contained in main memory 1004. Such instructions may be read into main memory 1004 from another non-transitory computer-readable medium (e.g., a storage device).

Execution of sequences of instructions contained in main memory 1004 may cause the processor 1001 to perform one or more of the procedures or steps described herein. In selected embodiments, one or more processors in a multi-processing arrangement may also be employed to execute sequences of instructions contained in main memory 1004. Alternatively, or in addition thereto, firmware may be used in place of, or in connection with, software instructions to implement procedures or steps in accordance with the features and aspects disclosed herein. Thus, embodiments in accordance with the features and aspects disclosed herein may not be limited to any specific combination of hardware circuitry and software.

Non-transitory computer readable medium may refer to any medium that participates in holding instructions for execution by the processor 1001, or that stores data for processing by a computer, and comprise all computer-readable media, with the sole exception being a transitory, propagating signal. Such a non-transitory computer readable medium may include, but is not limited to, non-volatile media, volatile media, and temporary storage media (e.g., cache memory). Non-volatile media may include optical or magnetic disks, such as an additional storage device. Volatile media may include dynamic memory, such as main memory. Common forms of non-transitory computer-readable media may include, for example, a hard disk, a floppy disk, magnetic tape, or any other magnetic medium, a CD-ROM, DVD, Blu-ray or other optical medium, RAM, PROM, EPROM, FLASH-EPROM, any other memory card, chip, or cartridge, or any other memory medium from which a computer can read.

In selected embodiments, a communication interface 1002 may provide or support external, two-way data communication to or via a network link. For example, a communication interface 1002 may be a wireless network interface controller or a cellular radio providing a data communication network connection. Alternatively, a communication interface 1002 may comprise a local area network (LAN) card providing a data communication connection to a compatible LAN. In any such embodiment, a communication interface 1002 may send and receive electrical, electromagnetic, or optical signals conveying information.

A network link may provide data communication through one or more networks to other data devices (e.g., one or more terminals 801 as shown in the system 800). For example, a network link may provide a connection through a local network of a host computer or to data equipment operated by an Internet Service Provider (ISP). An ISP may, in turn, provide data communication services through the Internet. Accordingly, a computer 1000 may send and receive commands, data, or combinations thereof, including program code, through one or more networks, a network link, and communication interface 1002. Thus, the computer 1000 may interface or otherwise communicate with a remote server, or some combination thereof.

The various devices, modules, terminals, and the like discussed herein may be implemented on a computer by execution of software comprising machine instructions read from computer-readable medium, as discussed above. In certain embodiments, several hardware aspects may be implemented using a single computer, in other embodiments multiple computers, input/output systems and hardware may be used to implement the system.

For a software implementation, certain embodiments described herein may be implemented with separate software modules, such as procedures and functions, each of which perform one or more of the functions and operations described herein. The software codes can be implemented with a software application written in any suitable programming language and may be stored in memory and executed by a controller or processor.

The foregoing described embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method for writing, by a computing thread, data to a ring buffer, the method comprising:
   determining whether the ring buffer is full, based on an atomic variable that represents a number of stored elements in the ring buffer; and
   in response to determining that the ring buffer is not full:
   incrementing a size variable corresponding to the number of stored elements in the ring buffer;
   reserving a portion of the ring buffer at which the data is to be written;
   determining whether a state of the portion of the ring buffer is in change by at least one other computing thread; and
   in response to determining that the state of the portion of the ring buffer is not in change by the at least one other computing thread:
   marking the state of the portion of the ring buffer as being in change by the computing thread; and
   writing the data to the portion of the ring buffer.

2. The method of claim 1, wherein:
   the portion of the ring buffer comprises a plurality of elements; and
   reserving the portion of the ring buffer comprises reserving each element of the plurality of elements, each element corresponding to a different index of the ring buffer.

3. The method of claim 2, wherein determining whether the state of the portion is in change by the at least one other computing thread comprises determining whether a state of each element of the plurality of elements is in change by at least one other computer thread.

4. The method of claim 1, wherein determining whether the state of the portion of the ring buffer is in change by the at least one other computing thread is based on a state variable having one of at least three values.

5. The method of claim 4, wherein:
a first value of the state variable corresponds to an unoccupied state;
a second value of the state variable corresponds to an in-transition state; and
a third value of the state variable corresponds to an occupied state.

6. The method of claim 5, wherein marking the state of the portion of the ring buffer as being in change by the computing thread comprises marking (updating) the state variable to have the second value.

7. The method of claim 5, wherein:
the portion of the ring buffer comprises a plurality of elements; and
marking the state of the portion of the ring buffer as being in change by the computing thread comprises marking (updating) the state variable of a corresponding at least one element of the plurality of elements to have the second value.

8. The method of claim 7, wherein writing the data to the portion of the ring buffer comprises writing a respective subset of the data to the corresponding at least one element of the plurality of elements.

9. The method of claim 5, further comprising:
in response to writing the data to the portion of the ring buffer, marking (updating) the state variable to have the third value.

10. A machine-readable non-transitory medium having stored thereon machine-executable instructions for writing, by a computing thread, data to a ring buffer, the instructions comprising:
determining whether the ring buffer is full, based on an atomic variable that represents a number of stored elements in the ring buffer; and
in response to determining that the ring buffer is not full:
incrementing a size variable corresponding to the number of stored elements in the ring buffer;
reserving a portion of the ring buffer at which the data is to be written;
determining whether a state of the portion of the ring buffer is in change by at least one other computing thread; and
in response to determining that the state of the portion of the ring buffer is not in change by the at least one other computing thread:
marking the state of the portion of the ring buffer as being in change by the computing thread; and
writing the data to the portion of the ring buffer.

11. The machine-readable non-transitory medium of claim 10, wherein:
the portion of the ring buffer comprises a plurality of elements; and
reserving the portion of the ring buffer comprises reserving each element of the plurality of elements, each element corresponding to a different index of the ring buffer.

12. The machine-readable non-transitory medium of claim 11, wherein determining whether the state of the portion is in change by the at least one other computing thread comprises determining whether a state of each element of the plurality of elements is in change by at least one other computer thread.

13. The machine-readable non-transitory medium of claim 10, wherein determining whether the state of the portion of the ring buffer is in change by the at least one other computing thread is based on a state variable having one of at least three values.

14. The machine-readable non-transitory medium of claim 13, wherein:
a first value of the state variable corresponds to an unoccupied state;
a second value of the state variable corresponds to an in-transition state; and
a third value of the state variable corresponds to an occupied state.

15. The machine-readable non-transitory medium of claim 14, wherein marking the state of the portion of the ring buffer as being in change by the computing thread comprises marking (updating) the state variable to have the second value.

16. The machine-readable non-transitory medium of claim 14, wherein:
the portion of the ring buffer comprises a plurality of elements;
marking the state of the portion of the ring buffer as being in change by the computing thread comprises marking (updating) the state variable of a corresponding at least one element of the plurality of elements to have the second value; and
writing the data to the portion of the ring buffer comprises writing a respective subset of the data to the corresponding at least one element of the plurality of elements.

17. The machine-readable non-transitory medium of claim 14, further comprising:
in response to writing the data to the portion of the ring buffer, marking (updating) the state variable to have the third value.

18. A method for reading data from a ring buffer by a computing thread, the method comprising:
determining whether the ring buffer is empty, based on an atomic variable that represents a number of stored elements in the ring buffer;
in response to determining that the ring buffer is not empty:
clearing an element of the ring buffer storing the data, wherein clearing the element comprises decrementing a size variable corresponding to the number of stored elements in the ring buffer;
identifying a portion of the ring buffer from which the data is to be read;
determining whether a state of the portion of the ring buffer is in change by at least one other computing thread; and
in response to determining that the state of the portion is not in change by the at least one other computing thread:
marking the state of the portion of the ring buffer as being in change by the computing thread;
reading the data from the portion of the ring buffer; and
destroying the data in the portion of the ring buffer.

* * * * *